(12) United States Patent
Meng et al.

(10) Patent No.: US 11,663,491 B2
(45) Date of Patent: May 30, 2023

(54) ALLOCATION SYSTEM, METHOD AND APPARATUS FOR MACHINE LEARNING, AND COMPUTER DEVICE

(71) Applicant: Cambricon Technologies Corporation Limited, Beijing (CN)

(72) Inventors: Xiaofu Meng, Beijing (CN); Yongzhe Sun, Beijing (CN); Zidong Du, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

(21) Appl. No.: 16/997,697

(22) Filed: Aug. 19, 2020

(65) Prior Publication Data
US 2020/0387400 A1 Dec. 10, 2020

Related U.S. Application Data

(63) Continuation-in-part of application No. PCT/CN2019/084101, filed on Apr. 24, 2019.

(30) Foreign Application Priority Data

Apr. 24, 2018 (CN) .......................... 201810372801.9

(51) Int. Cl.
*G06F 9/50* (2006.01)
*G06K 9/62* (2022.01)
(Continued)

(52) U.S. Cl.
CPC ............... *G06N 3/10* (2013.01); *G06F 9/505* (2013.01); *G06F 9/5072* (2013.01); *G06N 3/04* (2013.01); *G06F 2209/5019* (2013.01)

(58) Field of Classification Search
CPC .................. G06F 9/505; G06F 9/5072; G06F 2209/5019; G06F 9/5027; G06K 9/6256; G06N 3/04; G06N 3/10
See application file for complete search history.

(56) References Cited

U.S. PATENT DOCUMENTS

2018/0198889 A1* 7/2018 Vijayant ................ G06N 20/00
2019/0318245 A1* 10/2019 Song .................... G06N 3/0454

FOREIGN PATENT DOCUMENTS

CN 106164869 A 11/2016
CN 107783840 A 3/2018
(Continued)

OTHER PUBLICATIONS

CN201810372801.9, Official Action dated Jul. 31, 2020; 13 pages. No English Translation.
(Continued)

*Primary Examiner* — Sisley N Kim
(74) *Attorney, Agent, or Firm* — Getech Law LLC; Jun Ye

(57) ABSTRACT

An allocation system for machine learning, comprising a terminal server and a cloud server. The terminal server is used for: acquiring demand information; generating a control instruction according to the demand information, wherein the control instruction comprises a terminal control instruction and a cloud control instruction; parsing the terminal control instruction to obtain a terminal control signal; and calculating a terminal workload of a machine learning algorithm of each stage according to the terminal control signal to obtain a terminal computation result. The cloud server is used for parsing the cloud control instruction to obtain a cloud control signal, and calculating a cloud workload of the machine learning algorithm of each stage according to the cloud control signal to obtain a cloud computation result. The terminal computation result and the cloud computation result together compose an output result.

15 Claims, 11 Drawing Sheets

(51) Int. Cl.
  *G06N 3/04* (2006.01)
  *G06N 3/10* (2006.01)
  *G06F 18/214* (2023.01)

(56) References Cited

FOREIGN PATENT DOCUMENTS

| EP | 3126978 A1    | 2/2017  |
|----|---------------|---------|
| EP | 3126978 B1    | 2/2021  |
| WO | 2015153388 A1 | 10/2015 |
| WO | 2017176356 A3 | 2/2018  |

OTHER PUBLICATIONS

PCT/CN2019/084101, International Search Report dated Jul. 22, 2019; 10 pages. No English Translation.

Alhamali Abdulrahman et al., "FPGA -Accelerated Hadoop Cluster For Deep Learning Computations", IEEE International Conference On Data Mining Workshop, XP032859264, Nov. 14, 2015, pp. 565-574.

CN201810372801.9, Office Action dated Feb. 5, 2021; 35 pages. (With English Translation).

CN201810372801.9, Office Action dated Nov. 5, 2020; 30 pages. (With English Translation).

Distributed Deep Neural Networks over the Cloud, the Edge and End Devices, Surat Teerapittayanon, Harvard University, Sep. 6, 2017 pp. 1-12.

EP19793238.7, Extended European search report dated Mar. 12, 2021; 11 pages.

KLA-Tencor, "Parallelization Studies on Convolutional Neural Networks", Full Database Information Technology Series on Mag Thesis of China, 11th 2013, published on Nov. 15, 2013. (With brief English Explanation).

EP19793238.7—Communication pursuant to Article 94(3) EPC, dated Jan. 26, 2023, 6 pages.

\* cited by examiner

ALLOCATION SYSTEM, METHOD AND APPARATUS FOR MACHINE LEARNING, AND COMPUTER DEVICE

RELATED APPLICATIONS

This application claims the benefit of pending International Patent Application No. PCT/CN2019/084101, filed Apr. 24, 2019, and priority of Chinese Patent Application No. 201810372801.9 with the title of "Machine Learning Distribution System, Method and Device and Computer Equipment" filed on Apr. 24, 2018, the content of which is incorporated herein by reference in its entirety.

TECHNICAL FIELD

The present disclosure relates to the field of information processing technology, and specifically to an allocation system, a method, and an apparatus for machine learning, a computer device, and a computer-readable storage medium.

BACKGROUND

In recent years, major breakthroughs have been made in machine learning. For instance, in the field of machine learning technology, neural network models trained with deep learning algorithms have gained impressive achievements in image recognition, speech processing, and intelligent robots. A deep neural network simulates the neural connection structure of the human brain by building a model. When processing signals such as images, sounds, and texts, a deep neural network uses multiple transformation stages to describe the features of data in layers. However, as a result of the ever increasing complexity of machine learning algorithms, in the actual application process, the machine learning technology has the problems such as high resource consumption, slow computation speed, and high energy consumption.

For instance, in order to meet the requirement of universality, a traditional machine learning algorithm usually occupies a large amount of memory space in a terminal to store trained weights during processing.

However, the above-mentioned traditional method may lead to a long processing time and low processing efficiency of the machine learning algorithm.

SUMMARY

In order to overcome the problems in the related technologies at least to a certain extent, the present disclosure provides an allocation system, a method, and an apparatus for machine learning, a computer device, and a computer-readable storage medium that have high processing efficiency.

According to a first aspect of examples of the present disclosure, a machine learning allocation system is provided. The machine learning allocation system includes: a terminal server and a cloud server.

The terminal server is configured to obtain demand information and generate a control instruction according to the demand information, where the control instruction includes a terminal control instruction and a cloud control instruction. The terminal server is configured to parse the terminal control instruction to obtain a terminal control signal and compute a terminal workload of a machine learning algorithm of each stage to obtain a terminal computation result according to the terminal control signal.

The cloud server is configured to parse the cloud control instruction to obtain a cloud control signal and compute a cloud workload of a machine learning algorithm of each stage to obtain a cloud computation result according to the cloud control signal.

Together the terminal computation result and the cloud computation result form an output result.

In an example, when the terminal server computes the terminal workload of the machine learning algorithm of each stage to obtain the terminal computation result according to the terminal control signal, the terminal server is specifically configured to compute the terminal workload of each layer of a neural network to obtain the terminal computation result according to the terminal control signal.

When the cloud server computes the cloud workload of the machine learning algorithm of each stage to obtain the cloud computation result according to the cloud control signal, the cloud server is specifically configured to compute the cloud workload of each layer of the neural network to obtain the cloud computation result according to the cloud control signal.

In an example, the terminal server includes a terminal control module, a terminal computation module, and a terminal communication module. The terminal control module is connected to the terminal computation module and the terminal communication module respectively.

The terminal control module is configured to obtain demand information, generate a control instruction according to the demand information, and parse the control instruction to obtain a terminal control signal, where the control instruction includes a terminal control instruction and a cloud control instruction. The terminal computation module is configured to compute a terminal workload of each layer of a neural network according to the terminal control signal to obtain a terminal computation result.

In an example, the cloud server includes a cloud control module, a cloud computation module, and a cloud communication module. The cloud control module is connected to the cloud computation module and the cloud communication module respectively.

The cloud control module is configured to parse the cloud control instruction to obtain a cloud control signal. The cloud computation module is configured to compute a cloud workload of each layer of a neural network according to the cloud control signal to obtain a cloud computation result.

The cloud communication module is in communication connection with the terminal communication module, and is used for data interaction between the cloud server and the terminal server.

In an example, the terminal server further includes a terminal storage module. The terminal storage module is connected to the terminal control module and the terminal computation module respectively, and is configured to receive and store input data from the terminal.

In an example, the terminal control module includes a terminal instruction generating unit and a terminal instruction parsing unit.

The terminal instruction generating unit is connected to the terminal instruction parsing unit. Each of the terminal instruction generating unit and the terminal instruction parsing unit is connected to the terminal computation module, the terminal storage module, and the terminal communication module respectively.

The terminal instruction generating unit is configured to generate the corresponding cloud control instruction and the corresponding terminal control instruction according to a ratio between a computation capability of the cloud server and a computation capability of the terminal server.

In an example, the terminal computation module is connected to the terminal communication module. The terminal storage module is connected to the terminal communication module.

In an example, the cloud server further includes a cloud storage module. The cloud storage module is connected to the cloud control module and the cloud computation module respectively, and is configured to receive and store input data from the cloud.

In an example, the cloud control module includes a cloud instruction parsing unit. The cloud instruction parsing unit is connected to the cloud computation module, the cloud storage module, and the cloud communication module respectively.

In an example, the cloud computation module is connected to the cloud communication module. The cloud storage module is connected to the cloud communication module.

According to a second aspect of the examples of the present disclosure, a machine learning allocation method is provided. The machine learning allocation method includes:

obtaining a control instruction of a machine learning algorithm of each stage, where the control instruction of the machine learning algorithm of each stage includes a cloud control instruction and a terminal control instruction;

parsing the cloud control instruction and the terminal control instruction respectively, obtaining a cloud control signal according to the cloud control instruction, and obtaining a terminal control signal according to the terminal control instruction;

fetching data to be processed of the cloud according to the cloud control signal, and fetching data to be processed of the terminal according to the terminal control signal; and performing parallel integration computations on the data to be processed of the cloud and the data to be processed of the terminal to obtain an output result.

In an example, the step of obtaining the control instruction of the machine learning algorithm of each stage, where the control instruction of the machine learning algorithm of each stage includes the cloud control instruction and the terminal control instruction includes:

obtaining the control instruction of each layer of a neural network, where the control instruction of each layer of the neural network includes the cloud control instruction and the terminal control instruction.

In an example, the step of obtaining the control instruction of each layer of the neural network includes:

obtaining a computation capability of the cloud server and a computation capability of the terminal server;

generating the cloud control instruction according to the computation capability of the cloud server; and generating the terminal control instruction according to the computation capability of the terminal server.

In an example, after the step of obtaining the computation capability of the cloud server and the computation capability of the terminal server, the method includes:

computing a ratio between the computation capability of the cloud server and the computation capability of the terminal server; and generating the corresponding cloud control instruction and the corresponding terminal control instruction according to the ratio.

In an example, the parsing the cloud control instruction and the terminal control instruction respectively, obtaining the cloud control signal according to the cloud control instruction, and obtaining the terminal control signal according to the terminal control instruction includes:

parsing the cloud control instruction by using the cloud server to obtain the cloud control signal; and fetching corresponding cloud training data or cloud test data according to the cloud control signal.

In an example, the parsing the cloud control instruction and the terminal control instruction respectively, obtaining the cloud control signal according to the cloud control instruction, and obtaining the terminal control signal according to the terminal control instruction further includes:

parsing the terminal control instruction by using the terminal server to obtain the terminal control signal; and fetching corresponding terminal training data or terminal test data according to the terminal control signal.

In an example, the step of performing parallel integration computations on the data to be processed of the cloud and the data to be processed of the terminal to obtain the output result includes:

using the cloud server to compute a cloud workload of each layer of the neural network according to the cloud training data or the cloud test data to obtain a cloud computation result.

In an example, the step of performing parallel integration computations on the data to be processed of the cloud and the data to be processed of the terminal to obtain the output result further includes:

using the terminal server to compute a terminal workload of each layer of the neural network according to the terminal training data or the terminal test data to obtain a terminal computation result; and performing parallel integration on the cloud computation result and the terminal computation result to obtain the output result.

According to a third aspect of the examples of the present disclosure, a machine learning allocation apparatus is provided. The machine learning allocation apparatus includes:

an instruction obtaining module configured to obtain a control instruction of a machine learning algorithm of each stage, where the control instruction of the machine learning algorithm of each stage includes a cloud control instruction and a terminal control instruction;

an instruction parsing module configured to parse the cloud control instruction and the terminal control instruction respectively, obtain a cloud control signal according to the cloud control instruction, and obtain a terminal control signal according to the terminal control instruction;

a data fetching module configured to fetch data to be processed of the cloud according to the cloud control signal, and fetch data to be processed of the terminal according to the terminal control signal; and a parallel computation module configured to perform parallel integration computations on the data to be processed of the cloud and the data to be processed of the terminal to obtain an output result.

According to a fourth aspect of the examples of the present disclosure, a computer device including a memory and a processor is provided. A computer program is stored in the memory. The processor performs the steps of the method in any of the examples above when executes the computer program.

According to a fifth aspect of the examples of the present disclosure, a computer-readable storage medium is provided. A computer program is stored in the computer-readable storage medium, and performs the steps of the method in any of the examples above when executed by a processor.

The technical solutions provided by the examples of the present disclosure may have the following technical effects.

Each of the above-mentioned machine learning allocation system, method and apparatus, the computer device, and the computer-readable storage medium uses the cloud server and the terminal server in parallel, and generates the terminal control instruction that can be controlled by the terminal server in the terminal server and the cloud control instruction that can be controlled by the cloud server. The machine learning algorithm of each stage combines the computation result of the terminal server with the computation result of the cloud server to form the final output result, which may make full use of the computational resources of the terminal server and the cloud server. In this way, computations can be performed jointly on the cloud server and the terminal server device, which may greatly shorten the computation time and improve the computation speed and efficiency.

BRIEF DESCRIPTION OF THE DRAWINGS

The drawings herein are incorporated into the specification and constitute a part of the specification. The drawings show examples that conform to the application, and explain principles of the present disclosure together with the specification.

DETAILED DESCRIPTION

Figure 1:
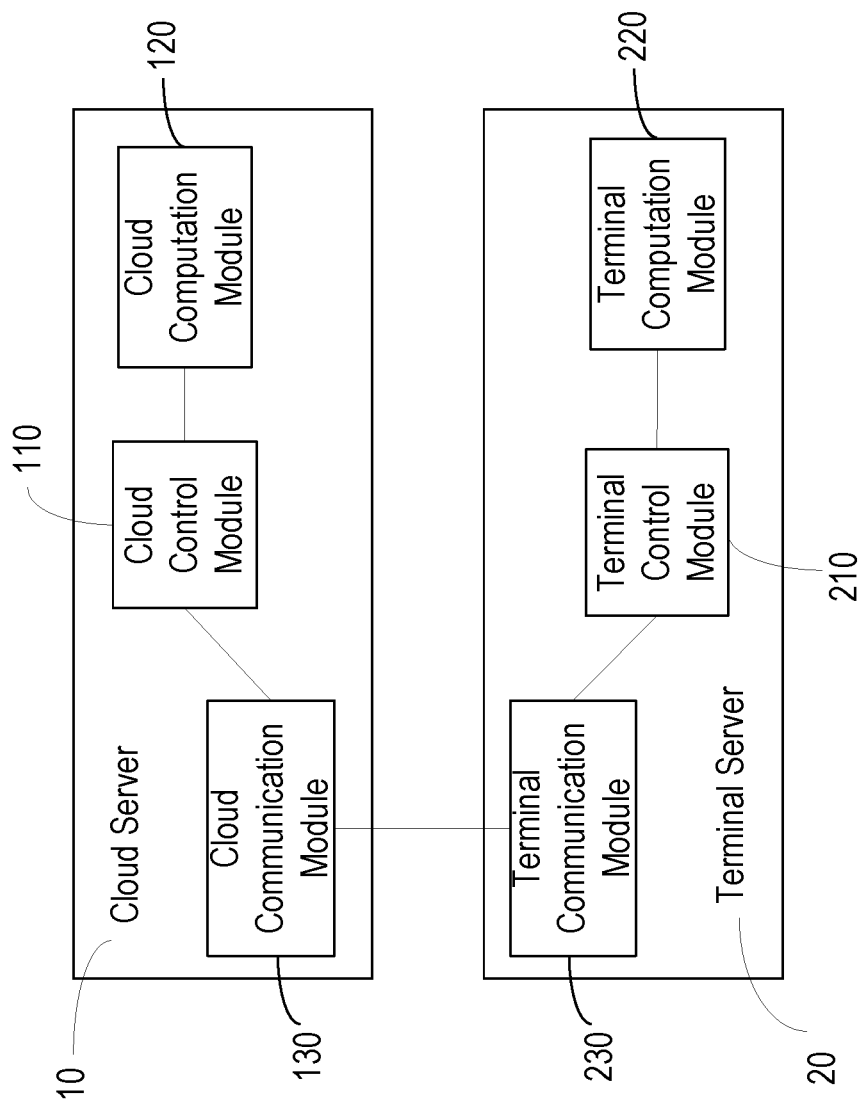
FIG. 1 is a structural diagram of a machine learning allocation system according to an example.

An allocation system, a method and an apparatus for machine learning, a computer device, and a computer-readable storage medium are described hereinafter more comprehensively with reference to the drawings in order to help understand the present disclosure. The drawings show preferred examples of the allocation system, the method, and the apparatus for machine learning, the computer device, and the computer-readable storage medium. However, the allocation system, the method, and the apparatus for machine learning, the computer device, and the computer-readable storage medium can be implemented in different forms, and are not limited to examples described in this specification. Instead, a purpose of presenting these examples is to disclose the allocation system, the method, and the apparatus for machine learning, the computer device, and the computer-readable storage medium more thoroughly and comprehensively.

An example provides a machine learning allocation system. The allocation system includes: a cloud server 10 and a terminal server 20. The terminal server 20 is configured to obtain demand information and generate a control instruction according to the demand information, where control instruction includes a terminal control instruction and a cloud control instruction. The terminal server 20 is configured to parse the terminal control instruction to obtain a terminal control signal and compute a terminal workload of a machine learning algorithm of each stage to obtain a terminal computation result according to the terminal control signal. The cloud server 10 is configured to receive the cloud control instruction, parse the cloud control instruction to obtain a cloud control signal, and compute a cloud workload of the machine learning algorithm of each stage to obtain a cloud computation result according cloud control signal. Finally, the terminal computation result and the cloud computation result together form an output result. In some examples, the cloud server 10 may be configured to combine the terminal computation result and the cloud computation result to generate the output result. In some other examples, the terminal server 20 may be configured to combined the terminal computation result and the cloud computation result to generate the output result.

Specifically, the machine learning algorithm includes but is not limited to a neural network algorithm and a deep learning algorithm. A machine learning algorithm has an obvious stage-by-stage characteristic, such as the computation of each neural network layer, each iteration of a clustering algorithm, and the like. Further, a machine learning algorithm may be divided into algorithms of a plurality of stages. In an example, the machine learning algorithm is a multi-layer neural network algorithm, and the plurality of stages include a plurality of layers. In another example, the machine learning algorithm is a clustering algorithm, and the plurality of stages are a plurality of iterations. In the computation of each stage, the cloud server and the terminal server can perform computations in parallel to achieve acceleration.

Each of the above-mentioned machine learning allocation system, method and apparatus, the computer device, and the computer-readable storage medium uses the cloud server and the terminal server in parallel, and generates the terminal control instruction that can be controlled by the terminal server in the terminal server and the cloud control instruction that can be controlled by the cloud server. The machine learning algorithm of each stage combines the computation result of the terminal server with the computation result of the cloud server to form the final output result, which may make full use of the computational resources of the terminal server and the cloud server. In this way, allocation of machine learning can be performed jointly on the cloud server and the terminal server device, which may greatly shorten the computation time and improve the computation speed and efficiency.

Further, in an example, a machine learning allocation system is provided. The allocation system includes: a cloud server 10 and a terminal server 20. The terminal server 20 is configured to obtain demand information and generate a control instruction according to the demand information, where control instruction includes a terminal control instruction and a cloud control instruction. The terminal server 20 is configured to parse the terminal control instruction to obtain a terminal control signal and compute a terminal workload of each layer of a neural network to obtain a terminal computation result according to the terminal control signal. The cloud server 10 is configured to receive the cloud control instruction, parse the cloud control instruction to obtain a cloud control signal, and compute a cloud workload of each layer of the neural network to obtain a cloud computation result according cloud control signal. Finally, the terminal computation result and the cloud computation result together form an output result.

The above-mentioned machine learning allocation system uses the cloud server and the terminal server in parallel, and generates the terminal control instruction that can be controlled by the terminal server in the terminal server and the cloud control instruction that can be controlled by the cloud server. In each layer of the neural network, the computation result of the terminal server is combined with the computation result of the cloud server to form the final output result, which may make full use of the computational resources of the terminal server and the cloud server. In this way, computations can be performed jointly on the cloud server and the terminal server device, which may greatly shorten the computation time and improve the computation speed and efficiency.

Referring to FIG. 1, in an example, the terminal server 20 includes a terminal control module 210, a terminal computation module 220, and a terminal communication module 230, where the terminal control module 210 is connected to the terminal computation module 220 and the terminal communication module 230 respectively. The terminal control module 210 is configured to obtain demand information, generate a control instruction according to the demand information, and parse the control instruction to obtain a terminal control signal, where the control instruction includes a terminal control instruction and a cloud control instruction. It should be noted that the terminal control module 210 parses the terminal control instruction to obtain the terminal control signal. The terminal computation module 220 is configured to compute a terminal workload of each layer of a neural network according to the terminal control signal to obtain a terminal computation result.

Specifically, a user may input corresponding demand information by using a terminal device according to actual needs. The terminal device includes an input obtaining unit that has a control function. The input obtaining unit can be selected by the user. For instance, the input obtaining unit may be an APP, or an API (Application Programming Interface) of another program, or the like. The demand information input by the user is mainly determined by three aspects: first, function demand information; second, accuracy demand information; and third, memory demand information.

The terminal control module 210 is configured to obtain demand information input by the user, and generate a control instruction according to the demand information. Further, the terminal control module 210 is configured to generate a corresponding control instruction according to a scale of each layer of the neural network, a computation capability of the cloud server 10, and a computation capability of the terminal server 20. It should be noted that an instruction set containing the control instruction is pre-stored in the cloud server 10 and the terminal server 20. The terminal control module 210 generates a cloud control instruction for the cloud server 10 and a terminal control instruction for the terminal server 20 respectively according to the input demand information.

Further, the terminal control module 210 is also configured to parse the terminal control instruction to obtain the terminal control signal. The terminal control module 210 sends the terminal control signal to the terminal computation module 220 and the terminal communication module 230. The terminal computation module 220 receives the corresponding terminal control signal, and computes the corresponding terminal workload of each layer of the neural network according to the terminal control signal to obtain a terminal computation result.

In an example, the cloud server 10 includes a cloud control module 110, a cloud computation module 120, and a cloud communication module 130, where the cloud control module 110 is connected to the cloud computation module 120 and the cloud communication module 130 respectively. The cloud control module 110 is configured to parse the cloud control instruction to obtain a cloud control signal. The cloud computation module 120 is configured to compute a cloud workload of each layer of a neural network according cloud control signal to obtain a cloud computation result. The cloud communication module 130 is in communication connection with the terminal communication module 230, and is used for data interaction between the cloud server 10 and the terminal server 20.

Specifically, the terminal control module 210 sends the generated cloud control instruction to the cloud server 10 through the terminal communication module 230. Specifically, in the cloud server 10, the cloud communication module 130 receives the cloud control instruction and sends the cloud control instruction to the cloud control module 110. The cloud control module 110 parses the cloud control instruction to obtain the cloud control signal and sends the cloud control signal to the cloud computation module 120 and the cloud communication module 130. The cloud computation module 120 receives the corresponding cloud control signal, and computes the corresponding cloud workload of each layer of the neural network according to the cloud control signal to obtain a cloud computation result.

It should be noted that the terminal workload and the cloud workload together constitute a total computation workload of each layer of the neural network. In addition, the computation task may also be a task of some layers of the neural network (for instance, a task of only computing a convolution layer), or a task of all the layers of the neural network, or some computation steps.

Further, when the cloud server 10 and the terminal server 20 are performing computations respectively, data communication between the cloud server 10 and the terminal server 20 is carried out simultaneously. The terminal communication module 230 sends data to the cloud communication module 130 according to the corresponding terminal control signal; and inversely, the cloud communication module 130 also sends data to the terminal communication module 230 according to the corresponding cloud control signal. When all computations are completed, a final terminal computation result is combined with a final cloud computation result to form a final output result. Then the final output result is sent to a user's terminal device. It should be noted that the terminal communication module and the cloud communication module transfer data between the terminal server and the cloud server respectively according to a communication protocol.

The above-mentioned machine learning allocation system uses the cloud server and the terminal server in parallel. The terminal server includes the terminal control module, the terminal computation module, and a terminal communication module. The cloud server includes the cloud control module, the cloud computation module, and the cloud communication module. By generating the terminal control instruction that can be controlled by the terminal server in the terminal server and the cloud control instruction that can be controlled by the cloud server, the system performs parallel integration computations on the workload of each layer of the neural network in the terminal server and the cloud server respectively according to the terminal control instruction and the cloud control instruction, and finally combines the computation result of the terminal server and the computation result of the cloud server to form the final output result. The machine learning allocation system realizes the coordination between the terminal server and the cloud server as well as complementarily completes an entire computation process of the neural network, so that the computational resources of the terminal server and the cloud server can be fully utilized. In this way, computations can be performed jointly on the cloud server and the terminal server device, which may greatly shorten the computation time and improve the computation speed and efficiency.

Figure 2:
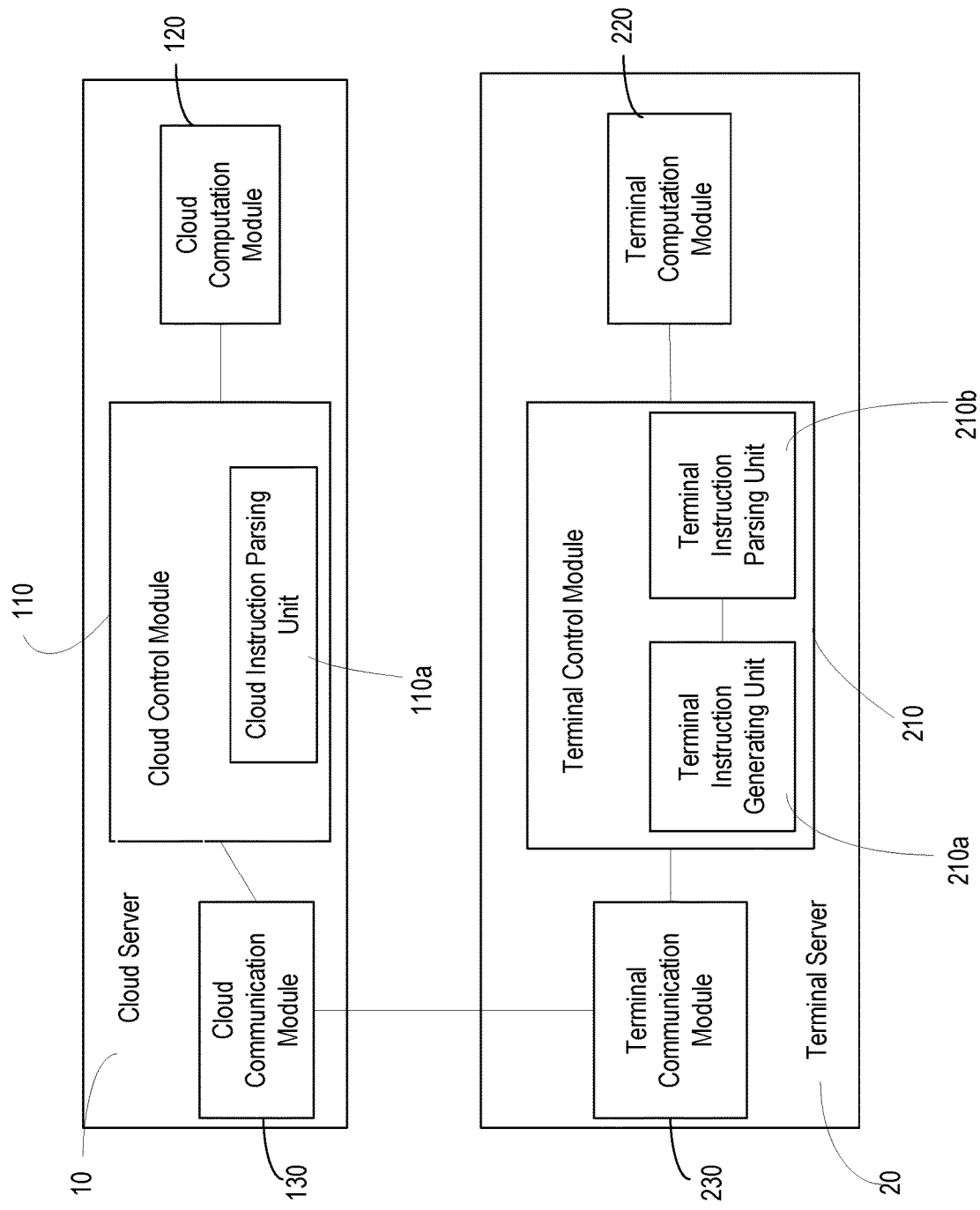
FIG. 2 is a structural diagram of a machine learning allocation system according to another example.
Figure 3:
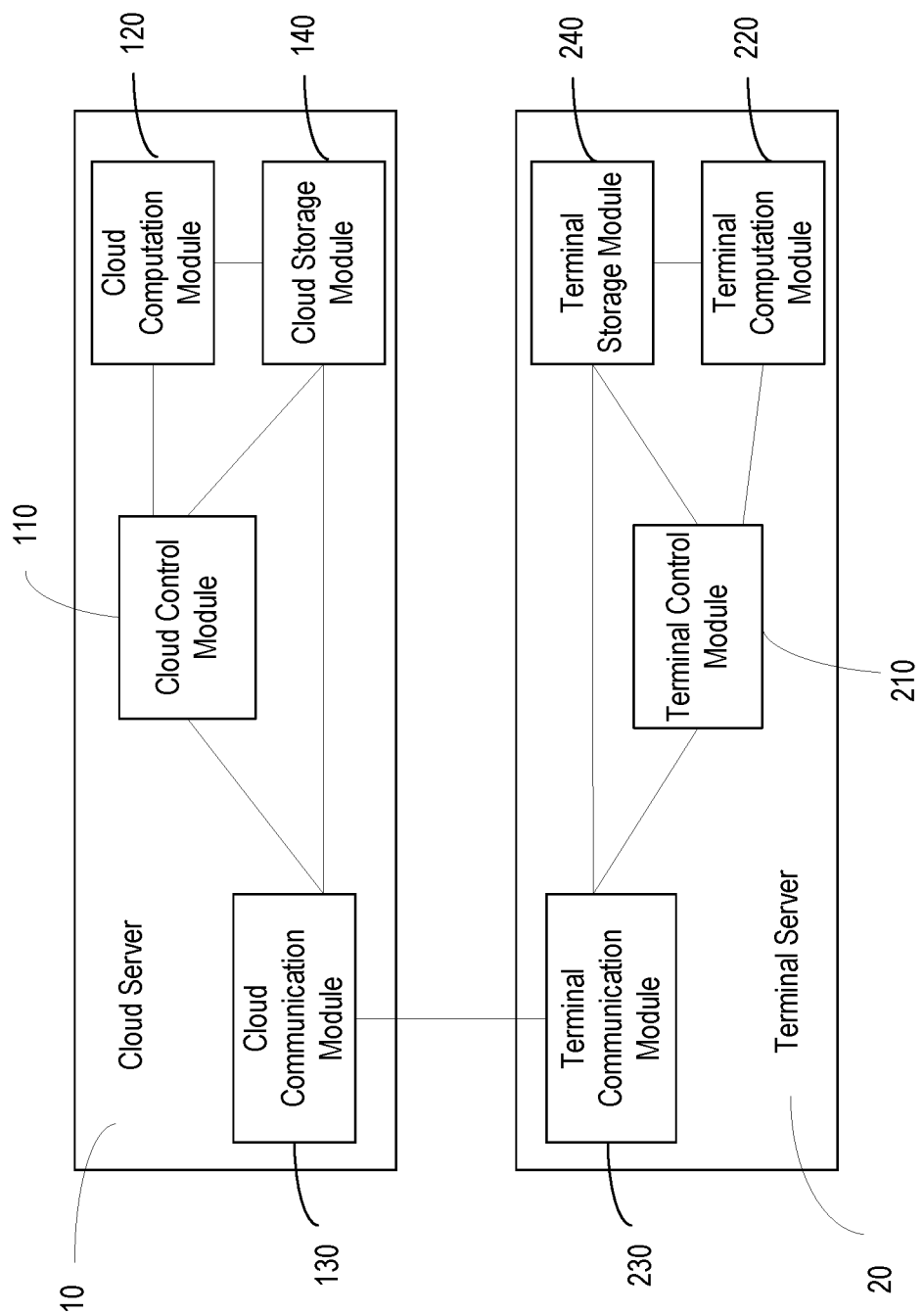
FIG. 3 is a structural diagram of a machine learning allocation system according to yet another example.

Referring to FIG. 2 and FIG. 3, in an example, the terminal control module 210 includes a terminal instruction generating unit 210a and a terminal instruction parsing unit 210b. The terminal instruction generating unit 210a is connected to the terminal instruction parsing unit 210b. Each of the terminal instruction generating unit 210a and the terminal instruction parsing unit 210b is connected to the terminal computation module 220, the terminal storage module 240, and the terminal communication module 230 respectively. The terminal instruction generating unit 210a is configured to generate a corresponding cloud control instruction and a corresponding terminal control instruction respectively according to a ratio between a computation capability of the cloud server and a computation capability of the terminal server.

Specifically, the terminal instruction generating unit 210a is configured to obtain demand information input by the user, make a judgment according to the demand information so as to determine a required neural network model, and generate the corresponding terminal control instruction and cloud control instruction. The control instruction of each of the terminal control instruction and the cloud control instruction may include a computation allocation instruction, a memory access instruction, and a data communication instruction. The terminal control instruction is used for control in the terminal server 20. The cloud control instruction is sent to the cloud communication module 130 through the terminal communication module 230, and is then sent from the cloud communication module 130 to the cloud control module 110 for control in the cloud server 10. The terminal instruction parsing unit 210b is configured to parse the terminal control instruction to obtain the terminal control signal, and to enable the terminal computation module 220, the terminal storage module 240, and the terminal communication module 230 to operate as instructed by the terminal control instruction according to the terminal control signal.

Further, in the process of generating the control instruction by the terminal instruction generating unit 210a, an allocation method of a computation allocation scheme may be: according to a scale of each layer of a neural network, the cloud server 10 and the terminal server 20 perform a computation task of each layer of the neural network in parallel; and according to the computation capability of the cloud server 10 and the computation capability of the terminal server 20, the computation task required by each layer of the neural network is subject to weighted allocation; then, according to an assigned computation task, the cloud computation module and the terminal computation module complete the computation task of each layer of the neural network together. By assigning the computation task of each layer of the neural network according to the computation capability of the cloud server and the terminal server, the computation capability of each server corresponds to the computation task of each layer of the neural network in a reasonable and accurate manner, which may further improve the computation efficiency of the computation task of each layer of the neural network.

Figure 4:
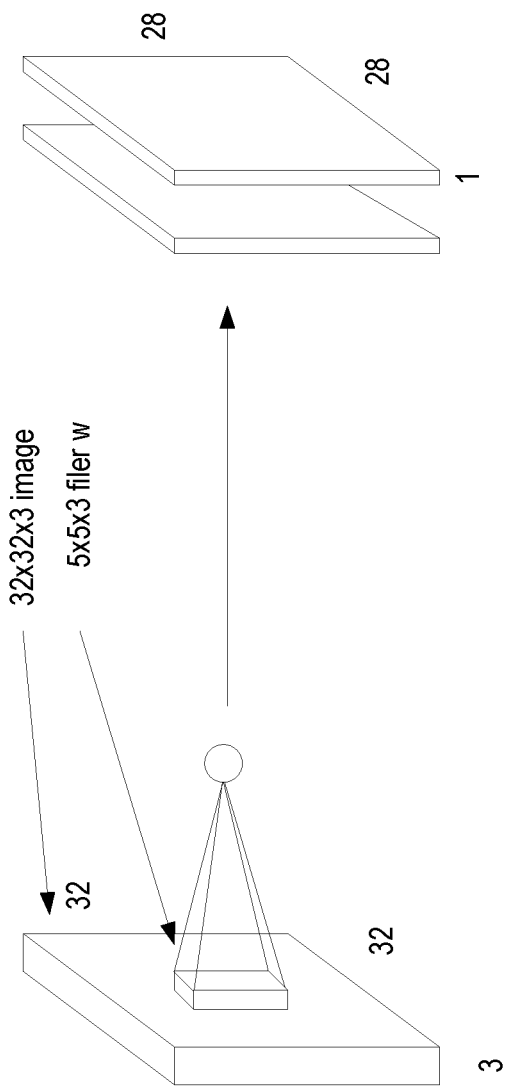
FIG. 4 is a structural diagram showing a way of allocating computations of a convolution neural network according to an example.

Optionally, referring to FIG. 4, the computation allocation method above is further described with a classic convolution neural network structure. A LeNet-5 classic convolution neural network is taken as an instance. In the LeNet-5 convolution neural network, for a convolution layer, an image is filtered by using different convolution kernels (filters) so that a template computation can be performed. A feature map can be obtained after each template slides on the input image. Since the computations of the filters are independent of each other, the filters have no data correlation between each other, thus parallel computations can be realized completely. If a count of filters required for the computation of the convolution layer is n, and the ratio between the computation capability of the cloud server 10 and that of the terminal server 20 is x:1, then the computation tasks of $(n*x)/(x+1)$ filters need to be placed on the cloud server 10, the computation tasks of $(n)/(x+1)$ filters are placed on the terminal server 20, and then the cloud server 10 and the terminal server 20 use a method of parallel computation to process the image to obtain n feature maps.

For another instance, the above-mentioned operation can also be performed on a pooling layer. Different templates are assigned to the cloud server 10 and the terminal server 20 according to the difference in the computation capabilities of the cloud server 10 and the terminal server 20.

For another instance, regarding a fully connected layer, since the fully connected layer uses a full match manner, if a count of rows passed into the fully connected layer is n, the ratio between the computation capability of the cloud server 10 and that of the terminal server 20 is x:1, first $(n*x)/(x+1)$ rows are placed in the cloud server 10 for computations, last $(n)/(x+1)$ rows are placed in the terminal server 20 for computation, and finally a computation result of the cloud server 10 and that of the terminal server 20 are collectively output. In addition, as long as the computation capabilities of the terminal server 20 and the cloud server 10 meet the requirement of execution, the first $(n)/(x+1)$ rows may be placed in the terminal server 20 for computations, and the last $(n*x)/(x+1)$ rows may be placed in the cloud server 10 for computations.

The memory access instruction is a memory management instruction based on computation allocation, and is used for controlling the terminal storage module 240 or the cloud storage module 140 to perform data storage. The data communication instruction is for data interaction between the cloud server 10 and the terminal server 20, and is used for controlling the data interaction between the terminal communication module and the cloud communication module.

In an example, the cloud control module 110 includes a cloud instruction parsing unit 110a. The cloud instruction parsing unit 110a is connected to the cloud computation module 120, the cloud storage module 140, and the cloud communication module 130 respectively.

Specifically, in the cloud server 10, the cloud instruction parsing unit 110a is configured to receive a cloud control instruction, parse the cloud control instruction to obtain a cloud control signal, and enable the cloud computation module 120, the cloud storage module 140, and the cloud communication module 130 to operate as instructed by the terminal control instruction according to the terminal control signal. It should be noted that the operating principles of the cloud computation module 120, the cloud storage module 140, and the cloud communication module 130 are the same as those of the terminal computation module 120, the terminal storage module 240, and the terminal communication module 130, and thus are not be repeated herein. The cloud instruction parsing unit 110a obtains the cloud control signal by parsing the cloud control instruction, and sends the cloud control signal to another component of the cloud server 10, so that the cloud server 10 can complete the computation of each layer of the neural network orderly. In this way, the computation speed of each layer of neural network may be improved.

In an example, the terminal server 20 further includes a terminal storage module. The terminal storage module 240 is connected to the terminal computation module 220 and the terminal control module 210 respectively. The terminal storage module 240 is configured to receive and store input data from the terminal.

Specifically, the terminal storage module 240 may determine the input data of the terminal according to the terminal control instruction generated by the terminal instruction generating unit 210a, store the data, and store the computation process of the terminal. Optionally, a storage data format may be a floating point number or a quantized fixed point number.

In addition, the terminal storage module 240 may be an apparatus or storage space capable of storing data, such as SRAM, DRAM, etc. The terminal storage module 240 is configured to store terminal data and a terminal instruction. The data includes but is not limited to at least one of input neurons, output neurons, weights, images, and vectors.

Figure 5:
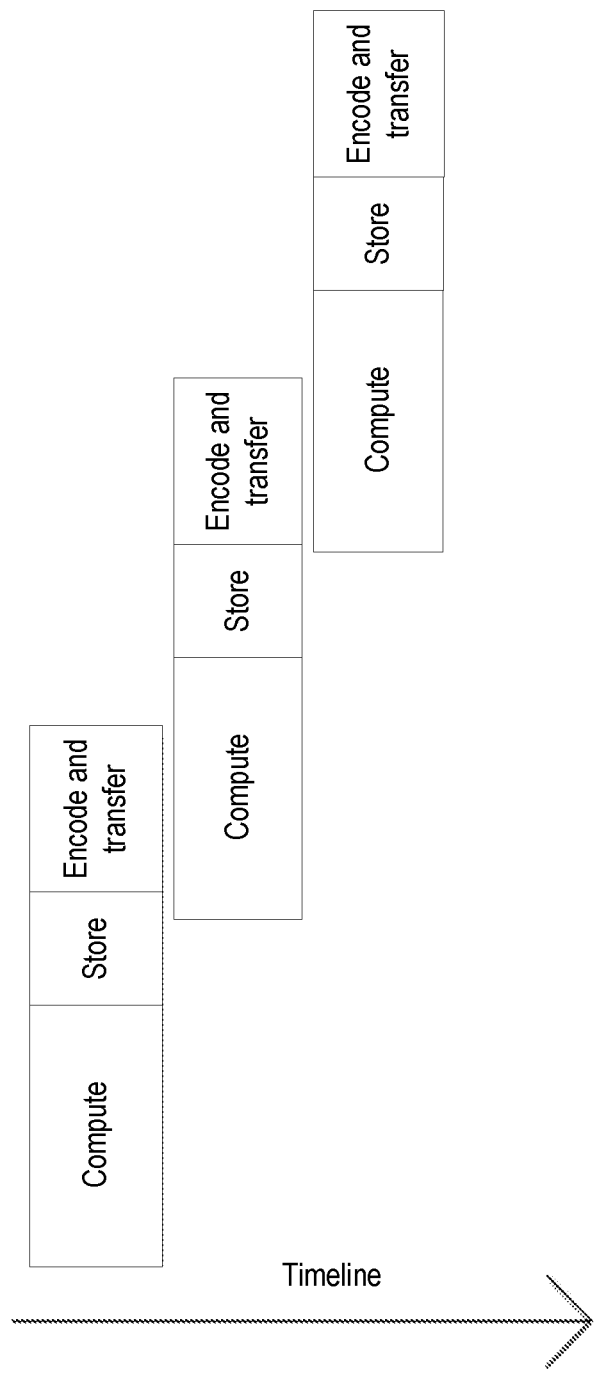
FIG. 5 is a diagram of a computation-storage-communication working mode according to an example.

Further, referring to FIG. 5, in the terminal server 20, the terminal computation module 220 and the terminal storage module 240 are two separate components. After the terminal computation module 220 finishes computing, the terminal computation module 220 first stores a terminal computation result in the terminal storage module 240, then the terminal storage module 240 and the terminal communication module 230 encode and transferring communicate the terminal computation result. In the process of encoding and transferring communication, the terminal computation module 220 has already started a next round of computation. Waiting delay may not be long in this working mode. For the terminal computation module 220, the equivalent computation time of each round is the actual computation time+the storage time. Since the storage time is much shorter than the encoding and transmission time, this method may fully utilize the computation capability of the terminal computation module 220, and make the terminal computation module 220 operate at full capacity. It should be noted that according to the above-mentioned working mode, the terminal control instruction can be generated correspondingly in the terminal instruction generating unit 210a. Optionally, the above can be completely implemented by an algorithm using a CPU device of the terminal server 20.

In an example, the cloud server 10 further includes a cloud storage module 140. The cloud storage module 140 is connected to the cloud computation module 120 and the cloud control module 110 respectively. The cloud storage module 140 is configured to receive and store input data from the cloud.

Specifically, the cloud storage module 140 may determine the input data of the cloud according to the cloud control instruction, store the data, and store the computation process of the cloud. Optionally, a storage data format may be a floating point number or a quantized fixed point number.

Preferably, the cloud storage module 140 may be an apparatus or storage space capable of storing data, such as SRAM, DRAM, etc. The cloud storage module 140 is configured to store cloud data and a cloud instruction. The data includes but is not limited to at least one of input neurons, output neurons, weights, images, and vectors.

Further, in the cloud server 10, the cloud computation module 120 and the cloud storage module 140 are two separate components. After the cloud computation module 120 finishes computing, the cloud computation module 120 first stores a cloud computation result in the cloud storage module 140, then the cloud storage module 140 and the cloud communication module 130 encode and transferring communicate the cloud computation result. In the process of encoding and transfer communication, the cloud computation module 120 has already started a next round of computation. Waiting delay may not be long in this working mode. For the cloud computation module 120, the equivalent computation time of each round is the actual computation time+the storage time. Since the storage time is much shorter than the encoding and transmission time, this method may fully utilize the computation capability of the cloud computation module 120, and make the cloud computation module 120 operate at full capacity. It should be noted that according to the above-mentioned working mode, the cloud control instruction can be generated correspondingly in the terminal instruction generating unit 210a.

In an example, the terminal computation module 220 is connected to the terminal communication module 230. The terminal storage module 240 is connected to the terminal communication module 230.

Specifically, the terminal communication module 230 may encode output data of the terminal computation module 220 and the terminal storage module 240 and send the encoded output data to the cloud communication module 130. Inversely, the terminal communication module 230 can also receive data sent by the cloud communication module 130, decode the data and send the decoded data to the terminal computation module 220 and the terminal storage module 240. By adopting the design method above, the workload of the terminal control module 210 can be reduced, so that the terminal control module 210 can complete the generation process of the control instruction in a more refined manner, and ensure that the terminal server 20 and the cloud server 10 can complete the collaborative computation more accurately.

In another example, the cloud computation module 120 is connected to the cloud communication module 130, and the cloud storage module 140 is connected to the cloud communication module 130.

Specifically, the cloud terminal communication module 130 may encode output data of the cloud computation module 120 and the cloud storage module 140 and send the encoded output data to the terminal communication module 230. Inversely, the cloud communication module 130 can also receive data sent by the terminal communication module 230, decode the data and send the decoded data to the cloud computation module 120 and the cloud storage module 140.

Further, in some examples, the terminal computation module 220 may be a computation component of the terminal server 20, and the cloud computation module 120 may be a computation component of the cloud server 10. For instance, the computation component may be a CPU, a GPU, or a neural network chip. Optionally, the terminal computation module 220 and the cloud computation module 120 may be computation units in a data processing unit of the artificial neural network chip, which are configured to perform corresponding computations on data according to a control instruction stored in a storage unit (the terminal storage module 240 or the cloud storage module 140).

In an example, the computation unit may include a plurality of computation circuits. The plurality of computation circuits are configured to perform computations of n pipeline stages, where n is greater than or equal to 2.

The computation unit is specifically configured to perform a computation of a first pipeline stage on data to obtain a first result, input the first result into a second pipeline stage, perform a computation of the second pipeline stage to obtain a second result, . . . , input the $n-1^{th}$ result into an $n^{th}$ pipeline stage, perform a computation of the $n^{th}$ pipeline stage to obtain an $n^{th}$ result, and input the $n^{th}$ result to the storage unit. n may be an integer greater than or equal to 3.

Specifically, the computation performed by the computation unit includes a neural network operation.

In an example, the computation unit includes but is not limited to: one or more multipliers in a first part; one or more adders in a second part (more specifically, the adders in the second part may also form an addition tree); an activation function unit of a third part; and/or a vector processing unit of a fourth part. More specifically, the vector processing unit may process vector computations and/or pooling computations. In the first part, input data 1 (in1) and input data 2 (in2) are multiplied to obtain output (out) after the multiplication, where the process is expressed as: out=in1*in2. In the second part, the input data (in1) is added by the adders to obtain output data (out). More specifically, when the second part is an addition tree, the input data in1 is added stage by stage by the addition tree to obtain output data (out), where in1 is a vector of length N, N is greater than 1, and the process is expressed as: out=in1[1]+in1[2]+ . . . +in1[N]; and/or the input data (in1) is accumulated by the addition tree and is then added with the input data (in2) to obtain output data (out), where the process is expressed as: out=in1[1]+in1[2]+ . . . +in1[N]+in2; or the input data (in1) and the input data (in2) are added to obtain output data (out), where the process is expressed as: out=in1+in2. In the third part, input data (in) is operated by an activation function (active) to obtain activated output data (out), where the process is expressed as: out=active(in), and the activation function (active) may be sigmoid, tanh, relu, softmax, etc. In addition to the activation computation, the third part may also realize another non-linear function. The third part may perform a computation (f) on the input data (in) to obtain output data (out), where the process is expressed as: out=f(in). The vector processing unit performs a pooling computation on the input data (in) to obtain output data (out) after the pooling computation, where the process is expressed as: out=pool(in), and pool refers to the pooling computation. The pooling computation includes but is not limited to: mean value pooling, maximum value pooling, median value pooling. The input data (in) is data in a pooling kernel related to the output (out).

A process of performing computations by the computation unit includes: in the first part, multiplying input data 1 and input data 2 to obtain data after the multiplication; and/or in the second part, performing an addition computation (more specifically, an addition tree computation is performed, where the input data 1 is added stage by stage by the addition tree), or adding the input data 1 and the input data 2 to obtain output data; and/or in the third part, performing an activation function computation, where the input data is operated by an activation function (active) to obtain output data; and/or in the fourth part, performing a pooling computation, where out=pool(in), pool is the pooling computation that includes but is not limited to: mean value pooling, maximum value pooling, median value pooling, and the input data (in) is data in a pooling kernel related to the output (out). One or more of the parts above may be selected freely and combined in different orders to perform the computations of the parts, so as to realize computations of various different functions. Accordingly, the computation unit forms a pipeline architecture with two stages, three stages, or four stages.

Figure 6A:
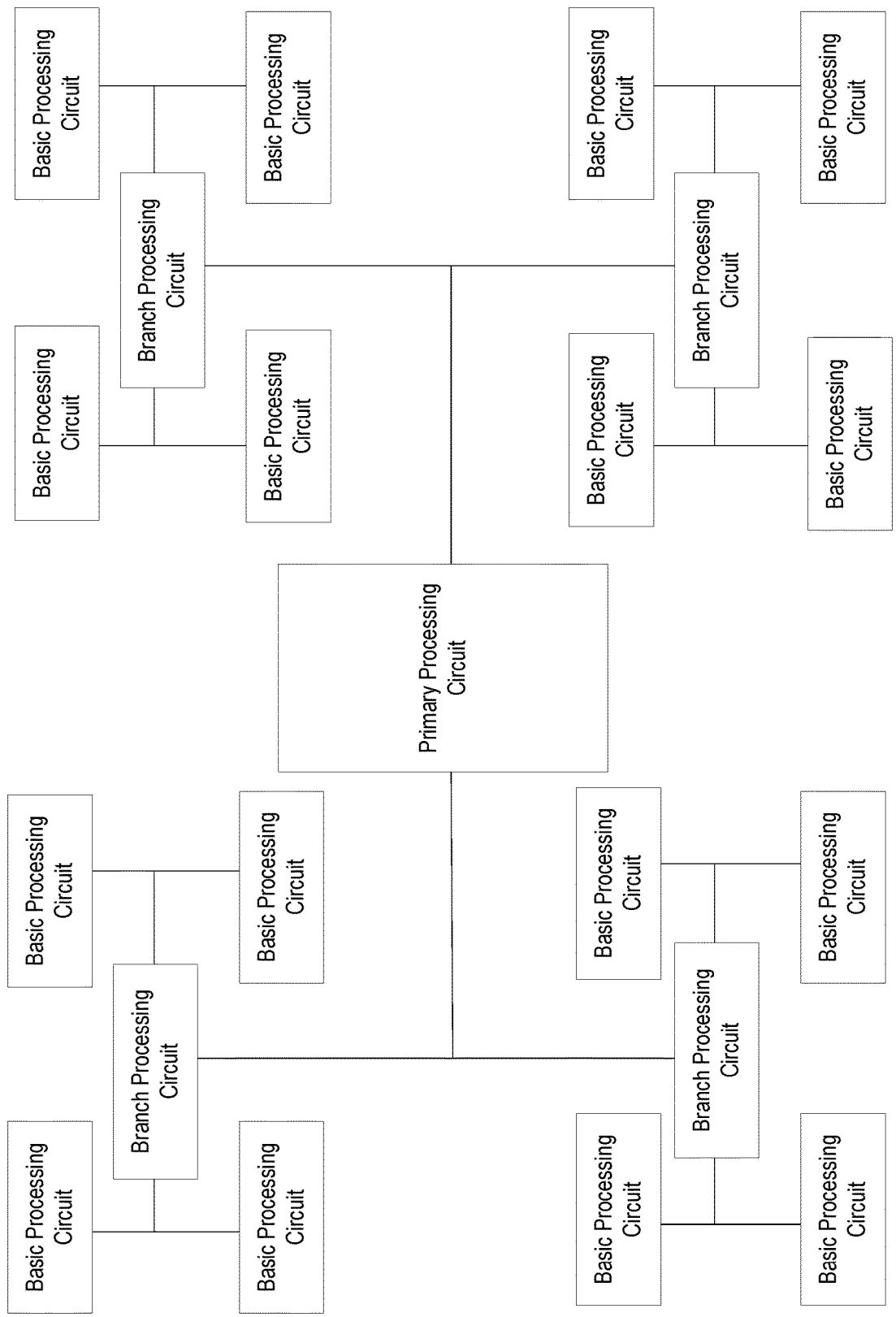
FIG. 6a is a structural diagram of a computation unit according to an example.

In an optional example, referring to FIG. 6a, a computation circuit may include a primary processing circuit, a basic processing circuit, and a branch processing circuit. Specifically, the primary processing circuit is connected to the branch processing circuit, and the branch processing circuit is connected to at least one basic processing circuit. The branch processing circuit is configured to receive and send data of the primary processing circuit or the basic processing circuit.

Figure 6B:
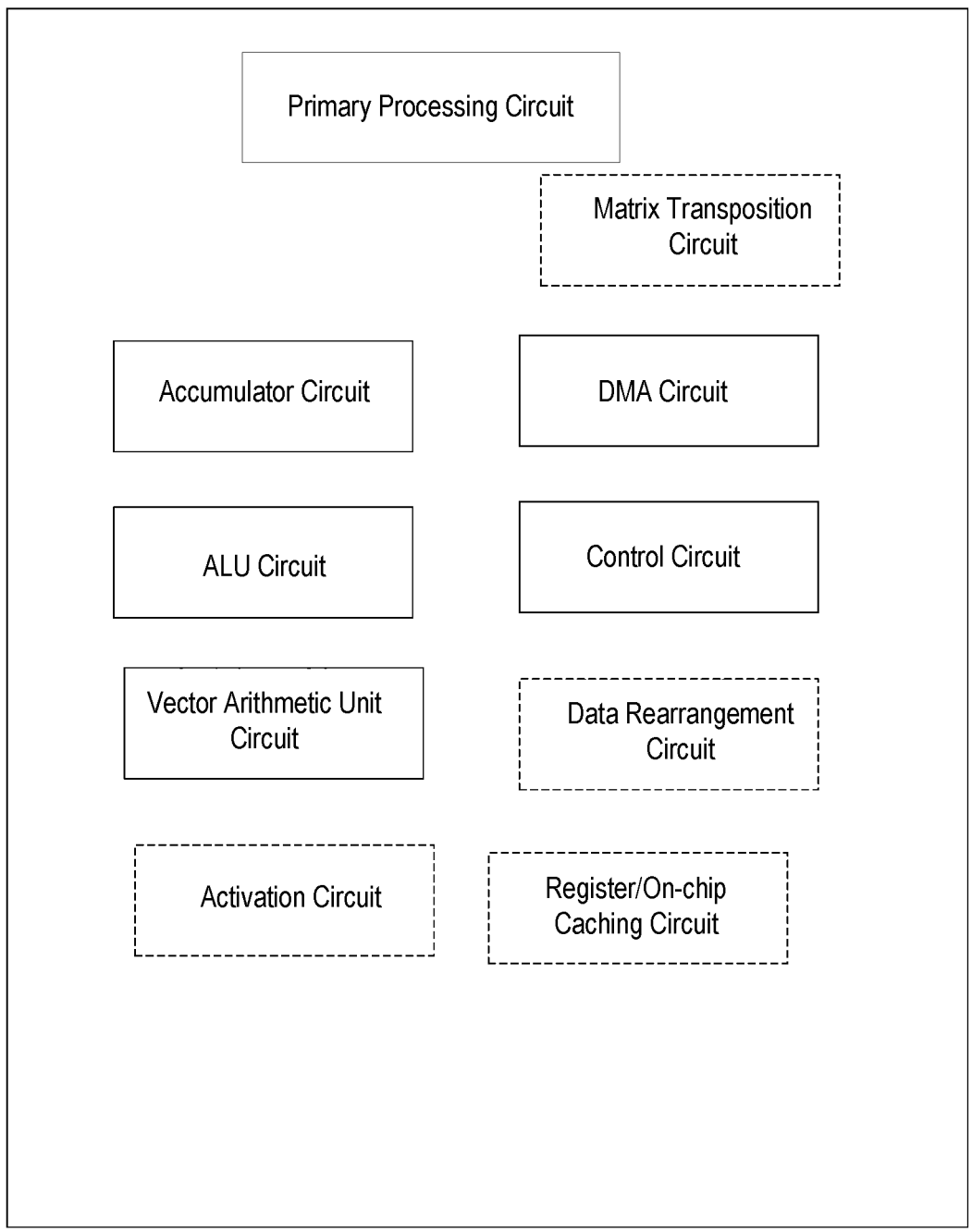
FIG. 6b is a structural diagram of a primary processing circuit according to an example.

Referring to FIG. 6b, the primary processing circuit may include a control circuit, a vector arithmetic unit circuit, an ALU (Arithmetic and Logic Unit) circuit, an accumulator circuit, a DMA (Direct Memory Access) circuit, and the like. Of course, in actual applications, the primary processing circuit may further include a conversion circuit (e.g., a matrix transposition circuit), a data rearrangement circuit, an activation circuit, or the like.

Figure 6C:
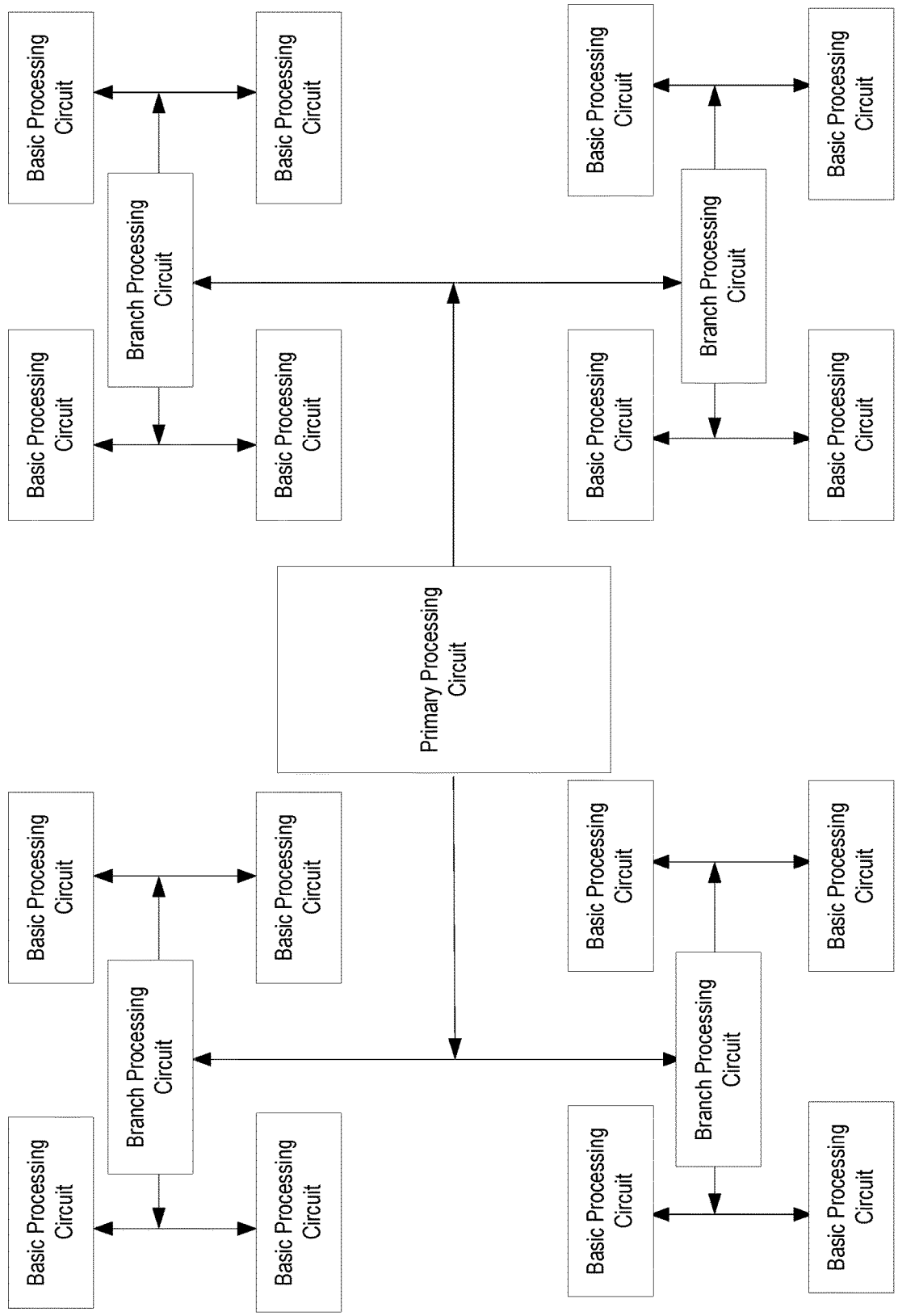
FIG. 6c is a data distribution diagram of a computation unit according to an example.

Referring to FIG. 6c, the primary processing circuit may also include a data transferring circuit, a data receiving circuit or interface. A data distribution circuit and a data broadcasting circuit may be integrated in the data transferring circuit. In actual applications, the data distribution circuit and the data broadcasting circuit may be set independently. In actual applications, the data transferring circuit and the data receiving circuit may also be integrated to form a data transceiving circuit. Data for broadcasting refers to data that needs to be sent to each basic processing circuit. Data for distribution refers to data that are to be selectively sent to some basic processing circuits. A specific selection method may be determined by the primary processing circuit according to a load and a computation method. A method for broadcasting data refers to transferring data for broadcasting to each basic processing circuit by broadcasting (in actual applications, the data for broadcasting may be broadcast to each basic processing circuit as a whole, or may be broadcast sequentially to each basic processing circuit, the times of broadcasting are not limited in the example of the present disclosure). A method for distributing data refers to selectively transferring data for distribution to some basic processing circuits.

When distributing data, a control circuit of the primary processing circuit transfers the data to some or all of the basic processing circuits. The data may be the same or different. Specifically, if the data is transferred by distributing, data received by each basic processing circuit may be different, and of course some of the basic processing circuits may receive the same data.

Specifically, when broadcasting data, the control circuit of the primary processing circuit transfers the data to some or all of the basic processing circuits. Each of the basic processing circuits may receive the same data. In other words, the data for broadcasting may include the data that need to be received by all of the basic processing circuits. The data for distributing may include data that needs to be received by some basic processing circuits. The primary processing circuit may send the data for broadcasting to all branch processing circuits as a whole or sequentially. The branch processing circuits may then forward the data for broadcasting to all the basic processing circuits.

Optionally, the vector arithmetic unit circuit of the primary processing circuit may be configured to perform a vector computation which includes but is not limited to: addition, subtraction, multiplication, and division between two vectors; addition, subtraction, multiplication, and division between a vector and a constant; or any computation performed on each element in a vector. Continuous computations may include computations between a vector and a constant, such as addition, subtraction, multiplication, division, activation computation, accumulation computation.

Each of the basic processing circuits may include a basic register and/or a basic on-chip caching circuit. Each of the basic processing circuits may further include one or any combination of an inner product arithmetic unit circuit, a vector arithmetic unit circuit, an accumulator circuit, and the like. The inner product arithmetic unit circuit, the vector arithmetic unit circuit, and the accumulator circuit may all be integrated circuits, and may also be circuits that are set independently.

A connection structure of the branch processing circuit and the basic processing circuits may be arbitrary and is not limited to an H-shape structure. Optionally, from the primary processing circuit to the basic processing circuits, the structure may be a structure of broadcasting or distributing; and from the basic processing circuits to the primary processing circuit, the structure be a structure of gathering. Definitions of broadcasting, distributing, and gathering are as follows:

The data transfer method from the primary processing circuit to the basic processing circuits may include: the primary processing circuit is connected to a plurality of branch processing circuits, and each of the branch processing circuits is connected to a plurality of basic processing circuits.

The primary processing circuit is connected to a branch processing circuit, and the branch processing circuit is connected to another branch processing circuit, and so on. In this way, the plurality of branch processing circuits are connected in series, and then each of the branch processing circuits is connected to a plurality of basic processing circuits respectively.

The primary processing circuit is connected to the plurality of branch processing circuits respectively, and each of the branch processing circuits is connected to a plurality of basic processing circuits in series.

The primary processing circuit is connected to a branch processing circuit, and the branch processing circuit is connected to another branch processing circuit, and so on. In this way, a plurality of branch processing circuits are connected in series, and then each of the branch processing circuits is connected to a plurality of basic processing circuits.

When distributing data, the primary processing circuit transfers the data to some or all of the basic processing circuits, and each of the basic processing circuits may receive different data.

When broadcasting data, the primary processing circuit transfers the data to some or all of the basic processing circuits, and each of the basic processing circuits may receive the same data.

When gathering data, some or all of the basic processing circuits transfer the data to the primary processing circuit. It should be noted that the chip apparatus may be a separate physical chip. Of course, in actual applications, the chip apparatus may also be integrated in another chip (such as CPU, GPU). The example of the present disclosure does not limit a physical implementation of the chip apparatus.

After the primary processing circuit receives external data, the primary processing circuit splits the external data and distributes the split data to the plurality of branch processing circuits, and the branch processing circuits send the split data to the basic processing circuits.

Figure 6D:
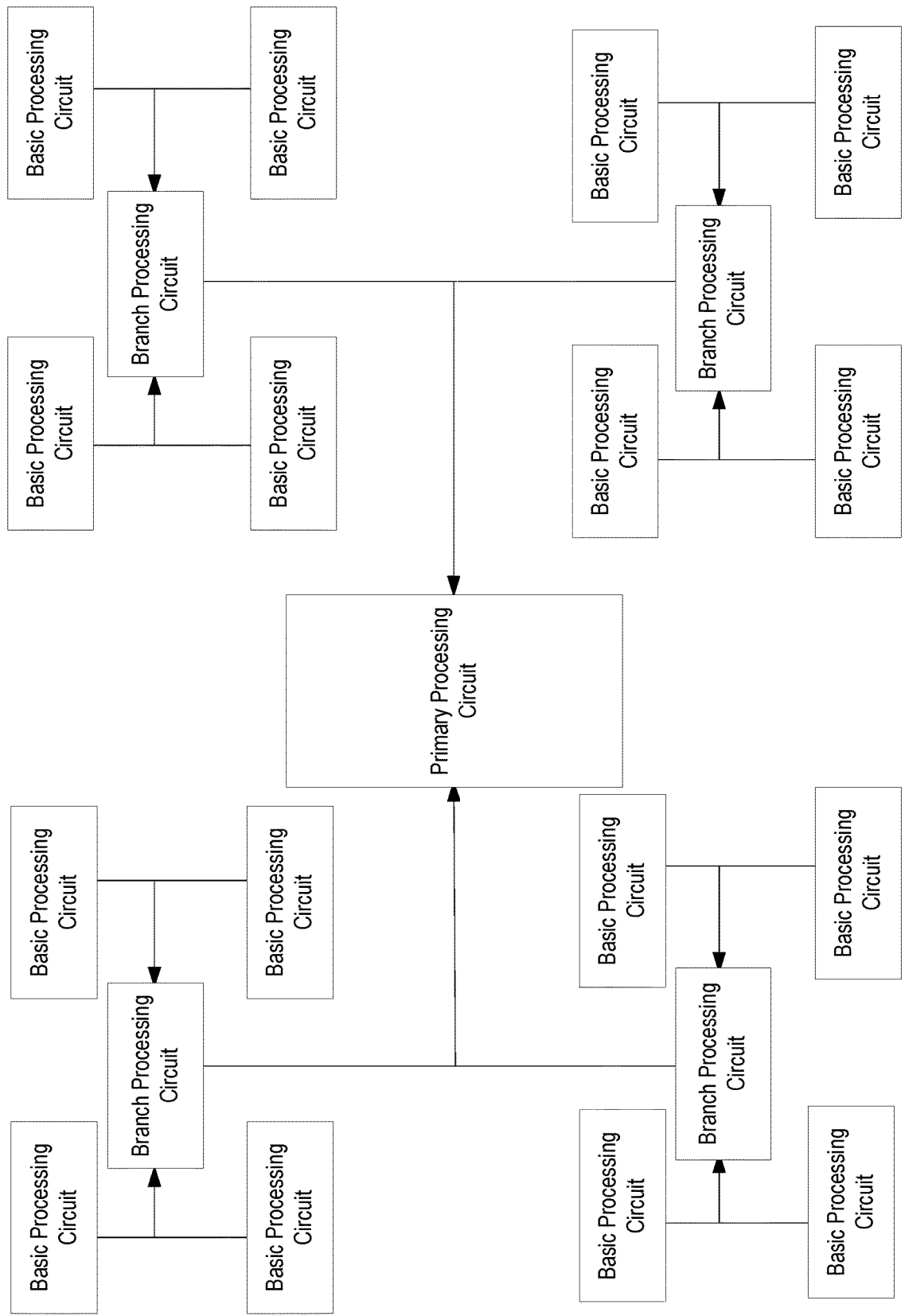
FIG. 6d is a schematic diagram showing transferring data back by a computation unit according to an example.

Referring to FIG. 6d, the basic processing circuits return data (such as the result of the inner product operation) to the branch processing circuit, and the branch processing circuit returns the data to the primary processing circuit.

Input data may specifically be a vector, a matrix, multi-dimensional (three-dimensional, or four-dimensional, or above) data. A specific value of the input data may be referred to as an element of the input data.

This example also provides a computation method for the computation unit as shown in FIG. 6a. The computation method is applied to neural network operations. Specifically, the computation unit may be configured to perform computations of input data and weight data of one or more layers of a multi-layer neural network.

Specifically, the foregoing computation unit is configured to perform computations on input data and weight data of one or more layers of a trained multi-layer neural network.

The computation unit may also be configured to perform computations on input data and weight data of one or more layers of a multi-layer neural network of forward computations.

The computation includes but is not limited to one or any combination of a convolution computation, a matrix-multiply-matrix computation, a matrix-multiply-vector computation, a bias computation, a fully connected computation, a GEMM computation, a GEMV computation, and an activation computation.

The GEMM computation refers to a computation of matrix-matrix multiplication in a BLAS library. A common expression of the computation is C=alpha*op(S)*(P)+beta*C, where S and P denote two input matrices, C denotes an output matrix, alpha and beta denote scalars, and op denotes an operation performed on the matrix S or P. In addition, some auxiliary integers are provided as parameters to illustrate the width and height of the matrices S and P.

The GEMV computation refers to a computation of matrix-vector multiplication in the BLAS library. A common expression of the computation is C=alpha*op(S)*P+beta*C, where S denotes an input matrix, P denotes an input vector, C denotes an output vector, alpha and beta denote scalars, and op denotes an operation performed on the matrix S.

Figure 7:
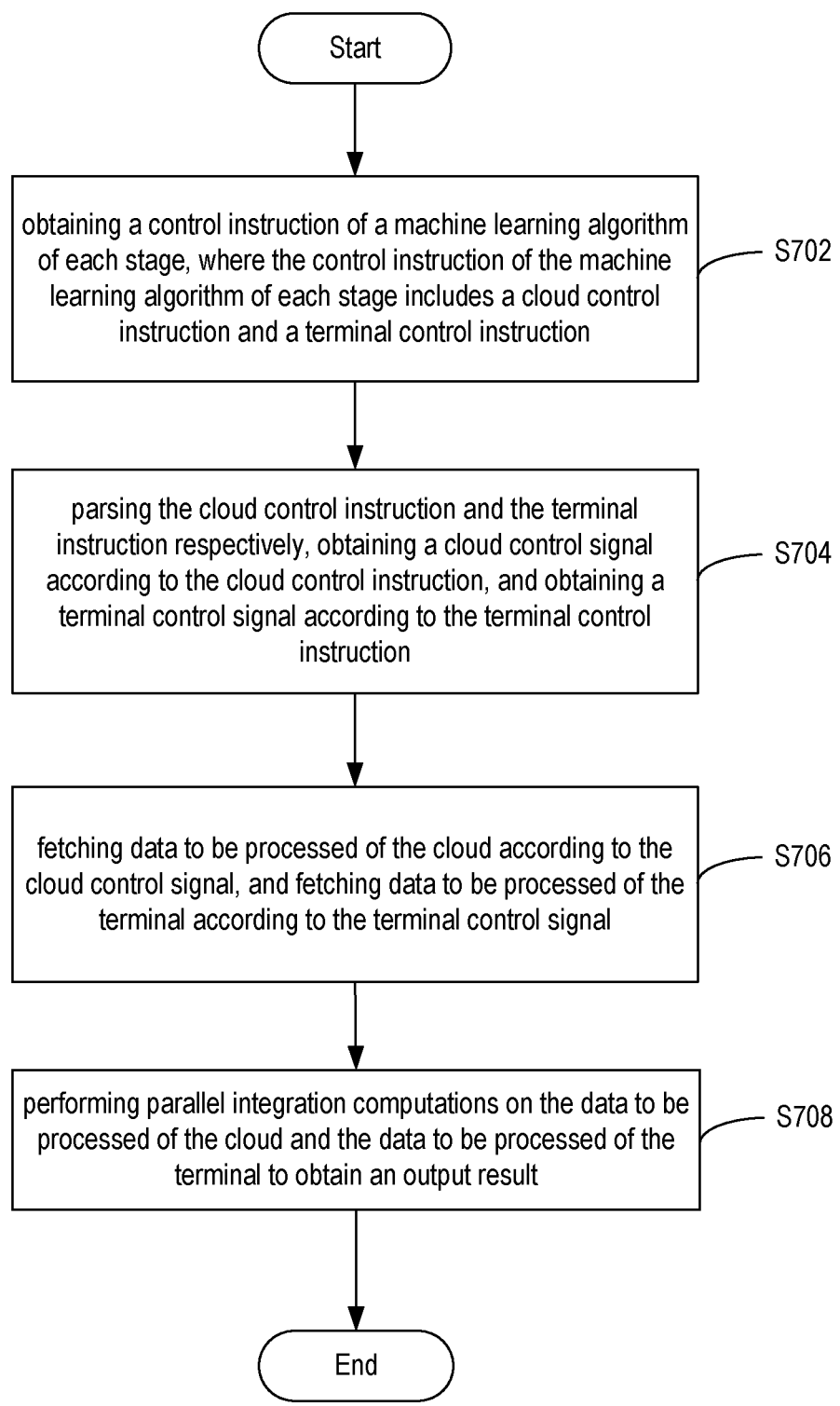
FIG. 7 is a flowchart of a machine learning allocation method according to an example.

Referring to FIG. 7, in an example, a machine learning allocation method is provided. The allocation method includes:

S702, obtaining a control instruction of a machine learning algorithm of each stage, where the control instruction of the machine learning algorithm of each stage includes a cloud control instruction and a terminal control instruction.

Specifically, the user inputs his or her demands by using the terminal device, and the terminal server obtains the demand information input by the user. The demand information input by the user is mainly determined by three aspects: first, function demand information; second, accuracy demand information; and third, memory demand information.

For instance, regarding the function demand information, a data set for identifying cats is included in a data set for identifying all animals. If the user only has a function demand of a certain vertical field, the user's demand is input by using an input obtaining unit of a control part, and a corresponding data set is selected according to the memory size and the required precision.

Further, in the terminal server, the terminal control module allocates required computation tasks according to the scale of the machine learning algorithm of each stage as well as the computation capabilities of the terminal server and the cloud server, so that the terminal server and the cloud server can compute the workload of the machine learning algorithm of each stage in parallel. In the terminal control module, the terminal instruction generating unit generates a corresponding terminal control instruction and a corresponding cloud control instruction according to the user's demand, the selected data set, and the computation capabilities of the terminal server and the cloud server.

Further, the terminal communication module and the cloud communication module transfer the control instructions between the cloud server and the terminal server. Specifically, after the control instruction is generated, the terminal communication module and the cloud communication module perform transmission between the terminal server and the cloud server respectively according to a communication protocol.

The allocation method includes: S704, parsing the cloud control instruction and the terminal instruction respectively, obtaining a cloud control signal according to the cloud control instruction, and obtaining a terminal control signal according to the terminal control instruction.

Specifically, after the terminal control module sends the cloud control instruction to the cloud server, the cloud instruction parsing unit in the cloud control module parses the cloud control instruction to obtain the cloud control signal. In the terminal control module, the terminal instruction parsing unit parses the terminal control instruction to obtain the terminal control signal.

The allocation method includes: S706, fetching data to be processed of the cloud according to the cloud control signal, and fetching data to be processed of the terminal according to the terminal control signal.

Specifically, the data to be processed includes one or more of training data or test data. In the cloud server, the cloud control module fetches the corresponding cloud training data or cloud test data according to the cloud control signal, and sends the cloud training data or cloud test data to a buffer of the cloud computation module. At the same time, the cloud control module may allocate a certain amount of memory space in advance for data interaction during computation. In the terminal server, the terminal control module fetches the corresponding terminal training data or terminal test data according to the terminal control signal, and sends the terminal training data or terminal test data to a buffer of the terminal computation module. At the same time, the terminal control module may allocate a certain memory space in advance for data interaction during computation.

The allocation method includes: S708, performing parallel integration computations on the data to be processed of the cloud and the data to be processed of the terminal to obtain an output result.

Specifically, in the cloud server, the cloud control module sends the data to be processed of the cloud to the cloud computation module. The cloud computation module computes a cloud workload of the machine learning algorithm of each stage according to the transferred data to be processed of the cloud. In the terminal server, the terminal control module sends the data to be processed of the terminal to the terminal computation module. The terminal computation module computes a terminal workload of the machine learning algorithm of each stage according to the transferred data to be processed of the terminal.

When the cloud server and the terminal server are performing computations, data communication between the cloud server and the terminal server is carried out simultaneously. The terminal communication module sends data to the cloud communication module according to the corresponding terminal control signal. Inversely, the cloud communication module sends data to the terminal communication module according to the corresponding cloud control signal. When all computations are completed, a final terminal computation result is combined with a final cloud computation result to form a final output result. The final output result is sent to the user's terminal device.

The above-mentioned machine learning allocation method uses the cloud server and the terminal server in parallel, and generates the terminal control instruction that can be controlled by the terminal server in the terminal server and the cloud control instruction that can be controlled by the cloud server. The machine learning algorithm of each stage combines the computation result of the terminal server with the computation result of the cloud server to form the final output result, which may make full use of the computational resources of the terminal server and the cloud server. In this way, computations can be performed jointly on the cloud server and the terminal server device, which may greatly shorten the computation time and improve the computation speed and efficiency.

Further, in an example of the present disclosure, the step S702 includes:

S7020, obtaining a control instruction of each layer of a neural network, where the control instruction of each layer of the neural network includes a cloud control instruction and a terminal control instruction.

Specifically, the machine learning algorithm includes but is not limited to a neural network algorithm and a deep learning algorithm. A machine learning algorithm has an obvious stage-by-stage characteristic, such as the computation of each neural network layer, each iteration of a clustering algorithm, and the like. Further, a machine learning algorithm may be divided into algorithms of a plurality of stages. In an example, the machine learning algorithm is a multi-layer neural network algorithm, and the plurality of stages include a plurality of layers. In another example, the machine learning algorithm is a clustering algorithm, and the plurality of stages are a plurality of iterations. In the computation of each stage, the cloud server and the terminal server can perform computations in parallel to achieve acceleration.

Further, in the terminal server, the terminal control module allocates required computation tasks according to the scale of each layer of the neural network as well as the computation capabilities of the terminal server and the cloud server, so that the terminal server and the cloud server can compute the workload of each layer of the neural network in parallel. In the terminal control module, the terminal instruction generating unit generates a corresponding terminal control instruction and a corresponding cloud control instruction according to the user's demand, the selected data set, and the computation capabilities of the terminal server and the cloud server.

In addition, the computation tasks may also be tasks of some layers of the neural network (for instance, tasks of only computing a convolution layer), or tasks of all the layers of the neural network, or some computation steps.

The above-mentioned machine learning allocation method uses the cloud server and the terminal server in parallel, and generates the terminal control instruction that can be controlled by the terminal server in the terminal server and the cloud control instruction that can be controlled by the cloud server. In each layer of the neural network, the computation result of the terminal server is combined with the computation result of the cloud server to form the final output result, which may make full use of the computational resources of the terminal server and the cloud server. In this way, computations can be performed jointly on the cloud server and the terminal server device, which may greatly shorten the computation time and improve the computation speed and efficiency.

In an example, the step S702 includes:

S7022, obtaining a computation capability of the cloud server and a computation capability of the terminal server;

S7024, generating the cloud control instruction according to the computation capability of the cloud server; and S7026, generating the terminal control instruction according to the computation capability of the terminal server.

Specifically, since the computation capabilities of the cloud server and the terminal server are different, the terminal control module generates the corresponding computation workload of the cloud server and the corresponding computation workload of the terminal server according to the computation capabilities of the cloud server and the terminal server. Further, an allocation method of a computation allocation scheme may be: according to the scale of each layer of the neural network, performing, by the cloud server and the terminal server, the computation workload of each layer of the neural network in parallel; and according to the computation capabilities of the cloud server and the terminal server, performing weighted allocation on the required computation task. In this way, the cloud server and the terminal server cooperate and complement each other to complete the computation process of the entire neural network.

In an example, after the step S7022, the method includes: computing a ratio between the computation capability of the cloud server and the computation capability of the terminal server, and generating the cloud control instruction and the terminal control instruction according to the ratio.

Specifically, the computation allocation method above is further described with a classic convolution neural network structure. Specifically, the classic convolution neural network structure may be a LeNet-5 classic convolution neural network. For a convolution layer of the LeNet-5 convolution neural network, an entire image is filtered by using different convolution kernels (filters) so that a template computation can be performed. Each template can obtain a feature map after sliding on the input image. Since the computations of the filters are independent of each other, the filters have no data correlation between each other, thus parallel computations can be realized completely. If a count of filters required is n, and the ratio between the computation capability of the cloud server and that of the terminal server is x:1, then the computation tasks of $(n*x)/(x+1)$ filters need to be placed on the cloud server, the computation tasks of $(n)/(x+1)$ filters are placed on the terminal server, and then the cloud server and the terminal server use a method of parallel computation to process the entire image to obtain n feature maps.

For another instance, the above-mentioned operation can also be performed on a pooling layer. Different templates are assigned to the cloud server and the terminal server according to the difference in the computation capability of the cloud server and that of the terminal server.

For another instance, regarding a fully connected layer, since the fully connected layer uses a full match manner, if a count of rows passed into the fully connected layer is n, the ratio between the computation capability of the cloud server and that of the terminal server is x:1, first $(n*x)/(x+1)$ rows are placed in the cloud server for computations, last $(n)/(x+1)$ rows are placed in the terminal server for computation, and finally a computation result of the cloud server and that of the terminal server are collectively output. In addition, as long as the computation capability of the terminal server and that of the cloud server meet the requirement of execution, the first $(n)/(x+1)$ rows may be placed in the terminal server for computations, and the last $(n*x)/(x+1)$ rows may be placed in the cloud server for computations.

In an example, the step S704 specifically includes:

S7042, parsing the cloud control instruction by using the cloud server to obtain the cloud control signal; and S7044, fetching corresponding cloud training data or cloud test data according to the cloud control signal.

Specifically, the cloud instruction parsing unit is configured to parse the cloud control instruction to obtain the cloud control signal, and fetch the corresponding cloud training data or cloud test data according to the cloud control signal. The data includes images, audio, text, etc. The images include still pictures, pictures that make up a video, or videos. The audio includes audio of human voice, music, noise, etc. The text includes structured text, text characters of various languages, etc.

In an example, the step S704 further includes:

S7046, parsing the terminal control instruction by using the terminal server to obtain the terminal control signal; and S7048, fetching corresponding terminal training data or terminal test data according to the terminal control signal.

Specifically, the terminal instruction parsing unit is configured to parse the terminal control instruction to obtain the terminal control signal, and fetch the corresponding terminal training data or terminal test data according to the terminal control signal.

In an example, the step S706 specifically includes:

S7062, using the cloud server to perform the corresponding computation of the neural network according to the cloud training data or the cloud test data to obtain a cloud computation result.

In another example, the step S706 specifically includes:

S7064, using the terminal server to perform the corresponding computation of the neural network according to the terminal training data or the terminal test data to obtain a terminal computation result; and S7066, combining the cloud computation result and the terminal computation result to obtain an output result.

In addition to the description of the examples above, in the cloud server, the cloud computation module performs the corresponding computation of the neural network according to the cloud training data or the cloud test data to obtain the cloud computation result. In the terminal server, the terminal computation module performs the corresponding computation of the neural network according to the terminal training data or the terminal test data to obtain the terminal computation result. In the computing process of the cloud server and the terminal server, the data communication between the terminal server and the cloud server is jointly completed by the cloud communication module and the terminal communication module. The data communication of a computation part and a storage part between the cloud server and the terminal server is forwarded by the cloud control module and the terminal communication module respectively, and finally the cloud communication module and the terminal communication module interact with each other. After the computations are completed, the cloud computation result and the terminal computation result are combined to obtain the final output result.

In an example, after the step S708, the method includes:

S709, sending the output result to the terminal for outputting.

Specifically, after all the computations are completed, the final output result is obtained. The final output result is sent to the terminal and displayed to the user.

It should be understood that though the steps in the flowchart of FIG. 7 are shown according to the direction indicated by arrows, yet these steps may not necessarily be performed in the order indicated by the arrows. Unless clearly stated herein, the order for performing these steps is not strictly restricted. These steps may be performed in a different order. Additionally, at least part of the steps shown in FIG. 7 may include a plurality of sub-steps or a plurality of stages. These sub-steps or stages may not necessarily be performed and completed at the same time, instead, these sub-steps or stages may be performed at different time. These sub-steps or stages may not necessarily be performed sequentially either, instead, these sub-steps or stages may be performed in turn or alternately with at least part of other steps, or sub-steps of other steps, or stages.

In an example, a machine learning allocation apparatus is provided. The allocation apparatus includes:

an instruction obtaining module configured to obtain a control instruction of a machine learning algorithm of each stage, where the control instruction of the machine learning algorithm of each stage includes a cloud control instruction and a terminal control instruction;

an instruction parsing module configured to parse the cloud control instruction and the terminal instruction respectively, obtain a cloud control signal according to the cloud control instruction, and obtain a terminal control signal according to the terminal control instruction;

a data fetching module configured to fetch data to be processed of the cloud according to the cloud control signal, and fetch data to be processed of the terminal according to the terminal control signal; and a parallel computation module configured to perform parallel integration computations on data to be processed of the cloud and the data to be processed of the terminal to obtain an output result.

The above-mentioned machine learning allocation apparatus uses the cloud server and the terminal server in parallel, and generates the terminal control instruction that can be controlled by the terminal server in the terminal server and the cloud control instruction that can be controlled by the cloud server. The machine learning algorithm of each stage combines the computation result of the terminal server with the computation result of the cloud server to form the final output result, which may make full use of the computational resources of the terminal server and the cloud server. In this way, computations can be performed jointly on the cloud server and the terminal server device, which may greatly shorten the computation time and improve the computation speed and efficiency.

Figure 8:
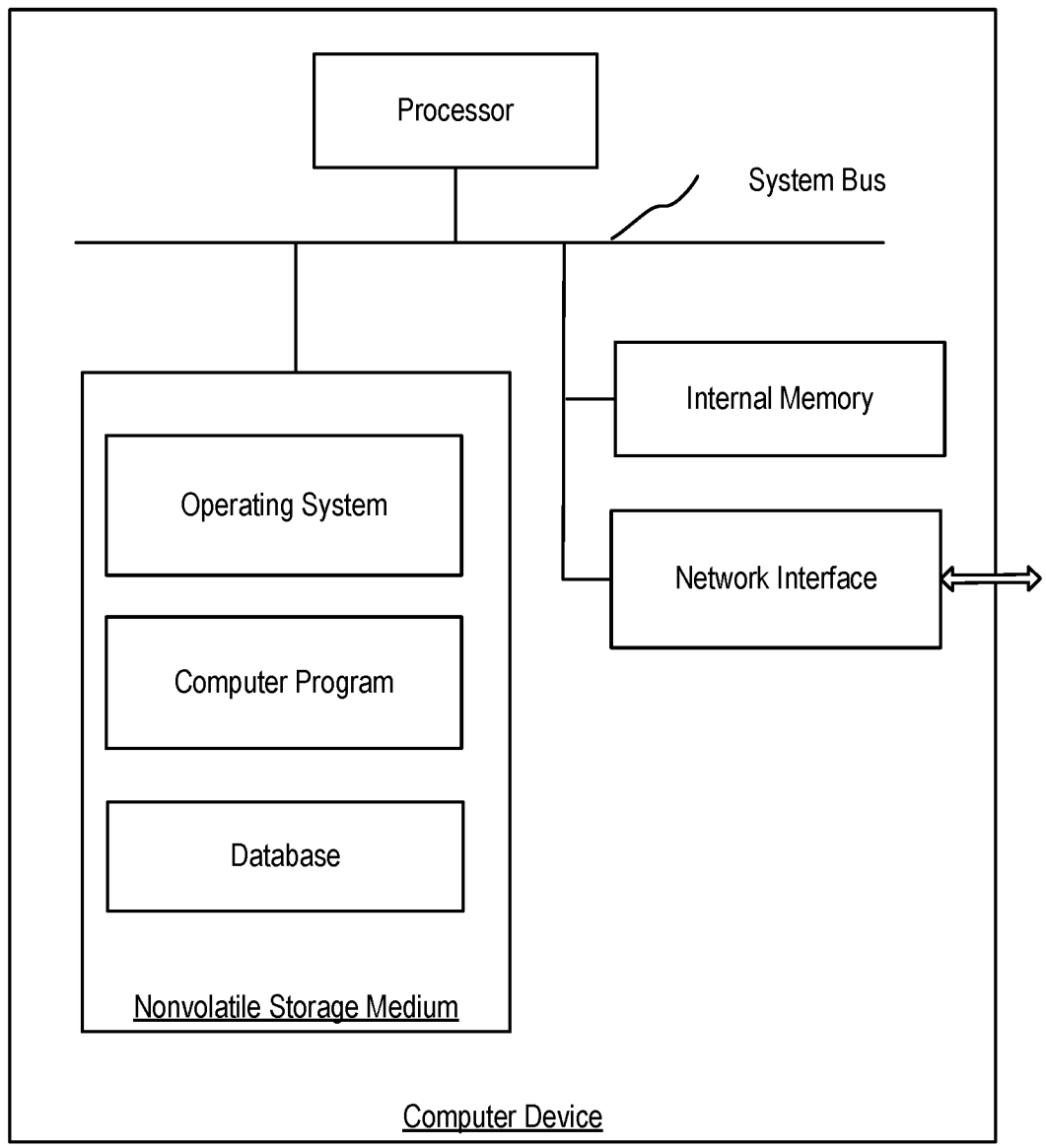
FIG. 8 is an internal structure diagram of a computer device according to an example.

Referring to FIG. 8, in an example, a computer device is provided. The computer device includes a memory, a processor, and a computer program that is stored in the memory and can be run on the processor. The processor implements the steps of the machine learning allocation method when executes the computer program. The steps includes: obtaining a control instruction of a machine learning algorithm of each stage, where the control instruction of the machine learning algorithm of each stage includes a cloud control instruction and a terminal control instruction; parsing the cloud control instruction and the terminal control instruction respectively, obtaining a cloud control signal according to the cloud control instruction, and obtaining a terminal control signal according to the terminal control instruction; fetching data to be processed of the cloud according to the cloud control signal, and fetching data to be processed of the terminal according to the terminal control signal; and performing parallel integration computations on the data to be processed of the cloud and the data to be processed of the terminal to obtain an output result.

The above-mentioned computer device uses the cloud server and the terminal server in parallel, and generates the terminal control instruction that can be controlled by the terminal server in the terminal server and the cloud control instruction that can be controlled by the cloud server. The machine learning algorithm of each stage combines the computation result of the terminal server with the computation result of the cloud server to form the final output result, which may make full use of the computational resources of the terminal server and the cloud server. In this way, computations can be performed jointly on the cloud server and the terminal server device, which may greatly shorten the computation time and improve the computation speed and efficiency.

In an example, a computer-readable storage medium is provided. The computer-readable storage medium stores a computer program. The computer program implements the steps of the machine learning allocation method when executed by a processor. The steps includes: obtaining a control instruction of a machine learning algorithm of each stage, where the control instruction of the machine learning algorithm of each stage includes a cloud control instruction and a terminal control instruction; parsing the cloud control instruction and the terminal control instruction respectively, obtaining a cloud control signal according to the cloud control instruction, and obtaining a terminal control signal according to the terminal control instruction; fetching data to be processed of the cloud according to the cloud control signal, and fetching data to be processed of the terminal according to the terminal control signal; and performing parallel integration computations on the data to be processed of the cloud and the data to be processed of the terminal to obtain an output result.

The above-mentioned computer-readable storage medium uses the cloud server and the terminal server in parallel, and generates the terminal control instruction that can be controlled by the terminal server in the terminal server and the cloud control instruction that can be controlled by the cloud server. The machine learning algorithm of each stage combines the computation result of the terminal server with the computation result of the cloud server to form the final output result, which may make full use of the computational resources of the terminal server and the cloud server. In this way, computations can be performed jointly on the cloud server and the terminal server device, which may greatly shorten the computation time and improve the computation speed and efficiency.

One of ordinary skill in the art can understand that the entire or part of the flow in the methods as stated in the examples may be carried out by instructing related hardware by a computer program. The computer program may be stored in a nonvolatile computer-readable storage medium. When the program is executed, the program may include the flow of each method as stated in the examples above. Any reference used in the examples provided in the present disclosure to the memory, storage, database, or any other medium may include a nonvolatile and/or volatile memory. The nonvolatile memory may include ROM (Read Only Memory), PROM (Programmable ROM), EPROM (Electrically PROM), EEPROM (Electrically Erasable PROM), or flash memory. The volatile memory may include RAM (Random Access Memory) or external cache memory. By way of illustration, and rather than limitation, RAM may be obtained in various forms, such as SRAM (Static RAM), DRAM (Dynamic RAM), SDRAM (Synchronous DRAM), DDRSDRAM (Double Data Rate SDRAM), ESDRAM (Enhanced SDRAM), SLDRAM (Synchlink DRAM), RDRAM (Rambus Direct RAM), DRDRAM (Direct Rambus Dynamic RAM), and RDRAM (Rambus Dynamic RAM).

Each technical feature of the examples above can be randomly combined. For conciseness, not all possible combinations of the technical features of the examples above are described. Yet, provided that there is no contradiction, combinations of these technical features fall within the scope of the description of the present specification.

The above-mentioned examples are merely some examples of the present disclosure. The disclosure is described in a detailed way. Nonetheless, it should not be considered limiting of the scope of protection claimed by the present disclosure. It should be indicated that one of ordinary skill in the art may make some variations and improvements within the idea of the disclosure, and these variations and improvements are within the scope of protection claimed by the present disclosure. Therefore, the scope of protection claimed by the present disclosure shall be subject to the attached claims.

What is claimed:

1. An allocation system for machine learning, comprising:
   a terminal server configured to:
      obtain demand information and generate a control instruction according to the demand information, wherein the control instruction includes a terminal control instruction and a cloud control instruction,
      parse the terminal control instruction to obtain a terminal control signal, and
      according to the terminal control signal, compute a terminal workload of a machine learning algorithm of each stage to obtain a terminal computation result; and
   a cloud server configured to:
      parse the cloud control instruction to obtain a cloud control signal, and
      according to the cloud control signal, compute a cloud workload of the machine learning algorithm of each stage to obtain a cloud computation result,
   wherein the terminal server is configured to compute the terminal workload of each layer of a neural network to obtain the terminal computation result according to the terminal control signal to generate the terminal workload of the machine algorithm of each stage,
   wherein the cloud server is configured to compute the cloud workload of each layer of the neural network to obtain the cloud computation result according to the cloud control signal to generate the cloud workload of the machine algorithm of each stage,
   wherein the terminal server includes a terminal control circuit, a terminal computation circuit, and a terminal communication circuit, wherein the terminal control circuit is connected to the terminal computation circuit and the terminal communication circuit respectively,
   wherein the terminal control circuit is configured to:
      obtain the demand information, generate the control instruction according to the demand information, and
      parse the control instruction to obtain the terminal control signal, wherein the control instruction includes the terminal control instruction and the cloud control instruction, and
   wherein the terminal computation circuit is configured to compute the terminal workload of each layer of the neural network according to the terminal control signal to obtain the terminal computation result,
   wherein the terminal server further includes a terminal storage circuit,
   wherein the terminal storage circuit is connected to the terminal control circuit and the terminal computation circuit respectively,
   wherein the terminal storage circuit is configured to receive and store input data from the terminal,
   wherein the terminal control circuit includes a terminal instruction generating circuit and a terminal instruction parsing circuit,
   wherein the terminal instruction generating circuit is connected to the terminal instruction parsing circuit,
   wherein each of the terminal instruction generating circuit and the terminal instruction parsing circuit is connected to the terminal computation circuit, the terminal storage circuit, and the terminal communication circuit respectively,
   wherein the terminal instruction generating unit is configured to generate the corresponding cloud control instruction and the corresponding terminal control instruction according to a ratio between a computation capability of the cloud server and a computation capability of the terminal server, and
   wherein the terminal computation circuit is connected to the terminal communication circuit, and the terminal storage circuit is connected to the terminal communication circuit.

2. The allocation system for machine learning of claim 1, wherein the cloud server includes a cloud control circuit, a cloud computation circuit, and a cloud communication circuit,
   wherein the cloud control circuit is connected to the cloud computation circuit and the cloud communication circuit respectively,
   wherein the cloud control circuit is configured to parse the cloud control instruction to obtain the cloud control signal,
   wherein the cloud computation circuit is configured to compute the cloud workload of each layer of the neural network according to the cloud control signal to obtain the cloud computation result, and
   wherein the cloud communication circuit is in communication connection with the terminal communication circuit for data interaction between the cloud server and the terminal server.

3. The allocation system for machine learning of claim 1, wherein the cloud server further includes a cloud storage circuit, wherein, the cloud storage circuit is connected to the cloud control circuit and the cloud computation circuit respectively, and is configured to receive and store input data from the cloud,
   wherein the cloud control circuit includes a cloud instruction parsing circuit,
   wherein the cloud instruction parsing circuit is connected to the cloud operation circuit, the cloud storage circuit, and the cloud communication circuit respectively, and
   wherein the cloud computation circuit is connected to the cloud communication circuit, and the cloud storage circuit is connected to the cloud communication circuit.

4. The allocation system of claim 1, wherein the terminal server is configured to combine the terminal computation result and the cloud computation result to generate an output result.

5. The allocation system of claim 1, wherein the cloud server is configured to combine the terminal computation result and the cloud computation result to generate an output result.

6. The allocation system of claim 1, wherein the instruction obtaining circuit is further configured to obtain a control instruction of each layer of a neural network, wherein the control instruction of each layer of the neural network includes a cloud control instruction and a terminal control instruction.

7. The allocation system of claim 6, wherein the instruction obtaining circuit is further configured to: obtain a computation capability of a cloud server and a computation capability of a terminal server, generate the cloud control instruction according to the computation capability of the cloud server, and generate the terminal control instruction according to the computation capability of the terminal server.

8. The allocation system of claim 7, further comprising a terminal instruction generating circuit configured to: compute a ratio between the computation capability of the cloud server and the computation capability of the terminal server, and generate the corresponding cloud control instruction and the corresponding terminal control instruction according to the ratio.

9. The allocation system of claim 6, wherein the instruction parsing circuit is further configured to: parse the cloud control instruction by using the cloud server to obtain the cloud control signal, fetch corresponding cloud training data or cloud test data according to the cloud control signal, parse the terminal control instruction by using the terminal server to obtain the terminal control signal, and fetch corresponding terminal training data or terminal test data according to the terminal control signal.

10. The allocation system of claim 9, wherein the parallel computation circuit is further configured to: use the cloud server to compute a cloud workload of each layer of the neural network according to the cloud training data or the cloud test data to obtain a cloud computation result, use the terminal server to compute a terminal workload of each layer of the neural network according to the terminal training data or the terminal test data to obtain a terminal computation result, and perform parallel integration on the cloud computation result and the terminal computation result to obtain the output result.

11. An allocation method for machine learning, comprising:
obtaining a control instruction of a machine learning algorithm of each stage, wherein, the control instruction of the machine learning algorithm of each stage includes a cloud control instruction and a terminal control instruction;
parsing the cloud control instruction and the terminal control instruction respectively,
obtaining a cloud control signal according to the cloud control instruction,
obtaining a terminal control signal according to the terminal control instruction;
fetching data to be processed of a cloud according to the cloud control signal, and fetching data to be processed of a terminal according to the terminal control signal; and
performing parallel integration computations on the data to be processed of the cloud and the data to be processed of the terminal to obtain an output result;
using the cloud server to compute a cloud workload of each layer of the neural network according to cloud training data or the cloud test data to obtain a cloud computation result,
using the terminal server to compute a terminal workload of each layer of the neural network according to the terminal training data or the terminal test data to obtain a terminal computation result, wherein the terminal server includes a terminal control circuit, a terminal computation circuit, and a terminal communication circuit, wherein the terminal control circuit is connected to the terminal computation circuit and the terminal communication circuit respectively,
obtaining, by the terminal control circuit, the demand information,
generating, by the terminal control circuit, the control instruction according to the demand information,
parsing, by the terminal control circuit, the control instruction to obtain the terminal control signal, wherein the control instruction includes the terminal control instruction and the cloud control instruction, wherein the terminal server further includes a terminal storage circuit, wherein the terminal storage circuit is connected to the terminal control circuit and the terminal computation circuit respectively,
receiving and storing, by the terminal storage circuit, input data from the terminal, wherein the terminal control circuit includes a terminal instruction generating circuit and a terminal instruction parsing circuit, wherein the terminal instruction generating circuit is connected to the terminal instruction parsing circuit, wherein each of the terminal instruction generating circuit and the terminal instruction parsing circuit is connected to the terminal computation circuit, the terminal storage circuit, and the terminal communication circuit respectively,
generating, by the terminal instruction generating circuit, the corresponding cloud control instruction and the corresponding terminal control instruction according to a ratio between a computation capability of the cloud server and a computation capability of the terminal server, wherein the terminal computation circuit is connected to the terminal communication circuit, and the terminal storage circuit is connected to the terminal communication circuit.

12. The allocation method for machine learning of claim 11, wherein: the obtaining the control instruction of each layer of the neural network includes:
obtaining a computation capability of a cloud server and a computation capability of a terminal server,
generating the cloud control instruction according to the computation capability of the cloud server, and
generating the terminal control instruction according to the computation capability of the terminal server.

13. The allocation method for machine learning of claim 12, further comprises after the obtaining the computation capability of the cloud server and the computation capability of the terminal server,
computing the ratio between the computation capability of the cloud server and the computation capability of the terminal server, and
generating the corresponding cloud control instruction and the corresponding terminal control instruction according to the ratio.

14. The allocation method for machine learning of claim 11, wherein the step of parsing the cloud control instruction and the terminal control instruction respectively includes:

parsing the cloud control instruction by using the cloud server to obtain the cloud control signal,
fetching corresponding the cloud training data or cloud test data according to the cloud control signal,
parsing the terminal control instruction by using the terminal server to obtain the terminal control signal, and
fetching corresponding terminal training data or terminal test data according to the terminal control signal.

15. The allocation method for machine learning of claim 14, wherein the performing parallel integration computations on the data to be processed of the cloud and the data to be processed of the terminal to obtain the output result includes:
, and
performing parallel integration on the cloud computation result and the terminal computation result to obtain the output result.

* * * * *